(12) United States Patent
Hara

(10) Patent No.: US 10,061,408 B2
(45) Date of Patent: Aug. 28, 2018

(54) STYLUS AND SENSOR CONTROLLER

(71) Applicant: Wacom Co., Ltd., Saitama (JP)

(72) Inventor: Hideyuki Hara, Tokyo (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 15/845,753

(22) Filed: Dec. 18, 2017

(65) Prior Publication Data

US 2018/0120963 A1 May 3, 2018

Related U.S. Application Data

(63) Continuation of application No. PCT/JP2016/073768, filed on Aug. 12, 2016.

(51) Int. Cl.

| | | |
|---|---|---|
| *G06F 3/03* | (2006.01) | |
| *G06F 3/16* | (2006.01) | |
| *G06F 21/50* | (2013.01) | |
| *G01S 15/06* | (2006.01) | |
| *G06F 3/041* | (2006.01) | |
| *G06F 3/0354* | (2013.01) | |

(Continued)

(52) U.S. Cl.
CPC .......... *G06F 3/03545* (2013.01); *G06F 3/041* (2013.01); *G06F 3/044* (2013.01); *G06F 3/046* (2013.01)

(58) Field of Classification Search
CPC ..... G06F 3/03–3/0416; G06F 3/03542–3/165; G06F 21/50; G01S 15/06
See application file for complete search history.

(56) References Cited

U.S. PATENT DOCUMENTS 3,925,777 A * 12/1975 Clark .................. G04G 9/0064
340/815.44
4,109,146 A * 8/1978 Hillman .............. G06F 3/03542
178/19.04

(Continued)

FOREIGN PATENT DOCUMENTS

| JP | 2015-141538 A | 8/2015 |
|---|---|---|
| JP | 2016-62217 A | 4/2016 |

(Continued)

OTHER PUBLICATIONS

Written Opinion of the International Searching Authority, dated Oct. 18, 2016, for International Application No. PCT/JP2016/073768, 4 pages.

*Primary Examiner* — Lin Li
(74) *Attorney, Agent, or Firm* — Seed Intellectual Property Law Group LLP

(57) ABSTRACT

A stylus is provided, which includes a core body, an electrode disposed adjacent to the core body, a transmitter that sends a downlink signal including switch information SW1 using the electrode, and a controller that determines whether the stylus is in contact state with an operating surface or the stylus is in hover state. In the contact state, the controller controls the transmitter to send the switch information SW1 at a first bit rate. In the hover state, the controller controls the transmitter to send the switch information SW1 at a second bit rate smaller than the first bit rate. A technical advantage includes lowering the possibility of a failure to receive downlink signals when the stylus is in hover state, even though the stylus sends the downlink signals with the same intensity as when the stylus is in contact state.

26 Claims, 15 Drawing Sheets

(51) Int. Cl.
*G06F 3/046* (2006.01)
*G06F 3/044* (2006.01)

(56) References Cited

U.S. PATENT DOCUMENTS

| | | | | |
|---|---|---|---|---|
| 5,239,139 A | * | 8/1993 | Zuta | G01S 15/06 |
| | | | | 178/19.02 |
| 6,441,810 B1 | * | 8/2002 | Skoog | G06F 3/03545 |
| | | | | 178/19.01 |
| 8,536,471 B2 | | 9/2013 | Stern et al. | |
| 8,773,405 B1 | | 7/2014 | Ryshtun et al. | |
| 2013/0106718 A1 | * | 5/2013 | Sundara-Rajan | G06F 3/03545 |
| | | | | 345/173 |
| 2013/0207938 A1 | * | 8/2013 | Ryshtun | G06F 3/0416 |
| | | | | 345/179 |
| 2014/0111461 A1 | * | 4/2014 | Rimon | G06F 3/03545 |
| | | | | 345/173 |
| 2014/0168116 A1 | * | 6/2014 | Sasselli | G06F 3/0416 |
| | | | | 345/173 |
| 2014/0327634 A1 | * | 11/2014 | Kim | G06F 21/50 |
| | | | | 345/173 |
| 2015/0346875 A1 | * | 12/2015 | Yeh | G06F 3/03545 |
| | | | | 345/174 |
| 2016/0188016 A1 | * | 6/2016 | Munakata | G06F 3/0416 |
| | | | | 345/179 |
| 2017/0060276 A1 | * | 3/2017 | Qiao | G06F 3/03545 |
| 2017/0153763 A1 | * | 6/2017 | Vavra | G06F 3/0488 |
| 2017/0255328 A1 | * | 9/2017 | Zyskind | G06F 3/03545 |
| 2017/0300172 A1 | * | 10/2017 | Donnelly | G06F 3/165 |

FOREIGN PATENT DOCUMENTS

| | | | | |
|---|---|---|---|---|
| JP | WO 2016/186191 | * | 11/2016 | G06F 3/03 |
| WO | 2015/002203 A1 | | 1/2015 | |
| WO | 2015/111159 A1 | | 7/2015 | |

* cited by examiner

F I G . 1
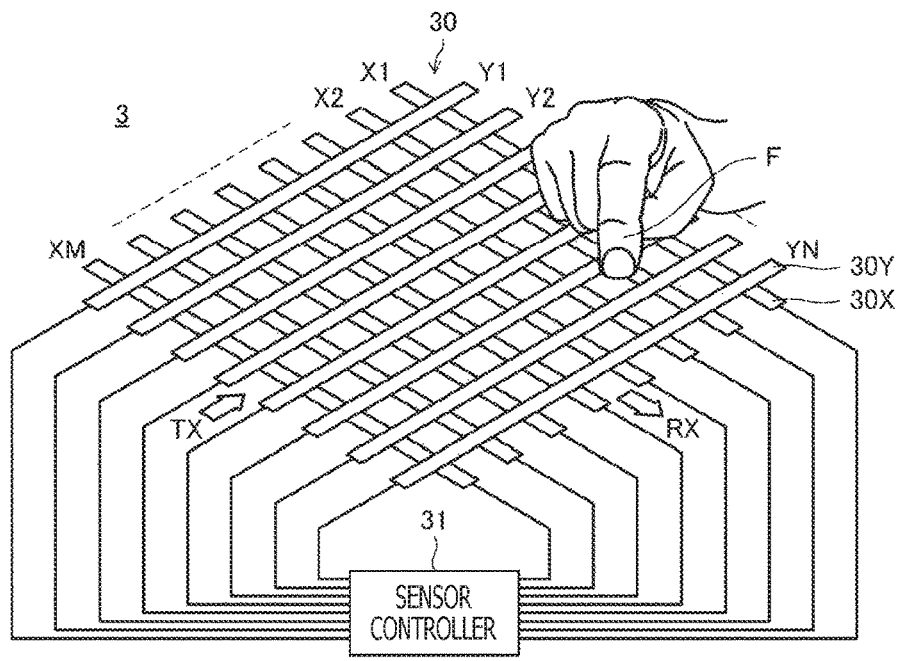
(a)
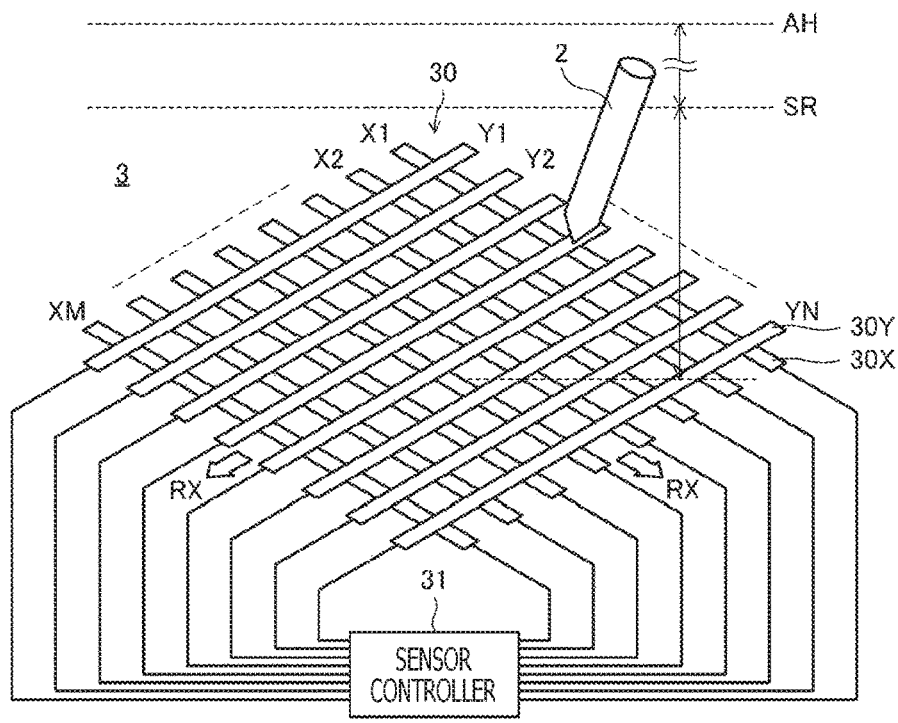
(b)

FIG.3
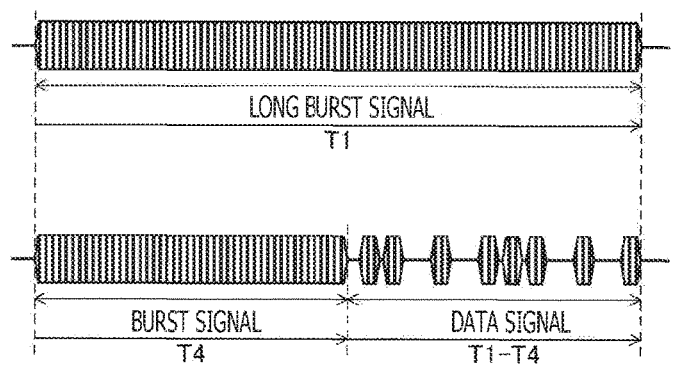
FIG.4
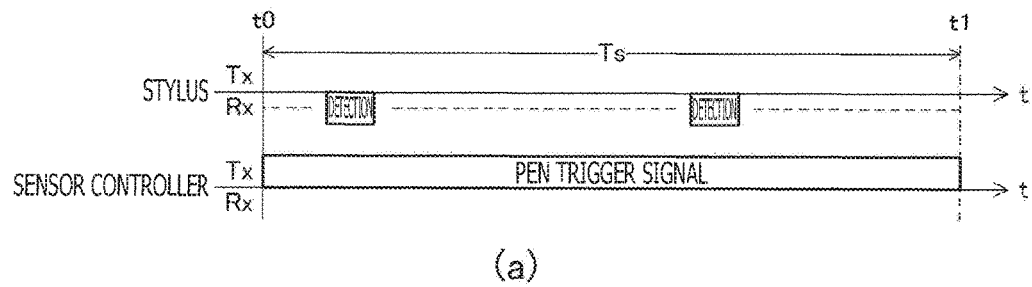
(a)
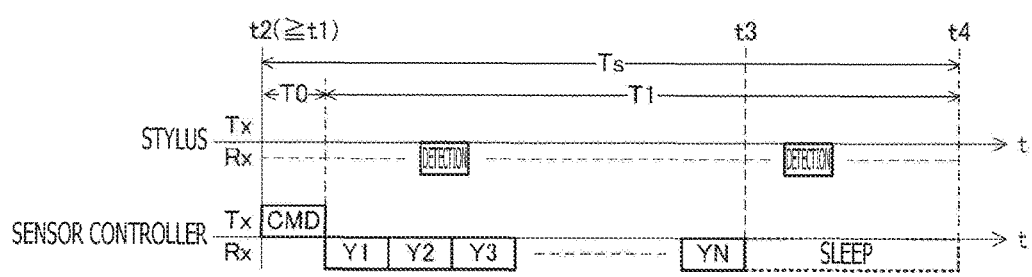
(b)

FIG.5
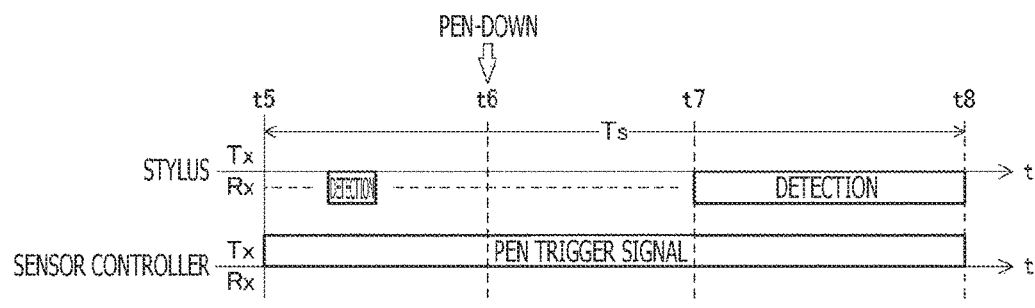
(a)
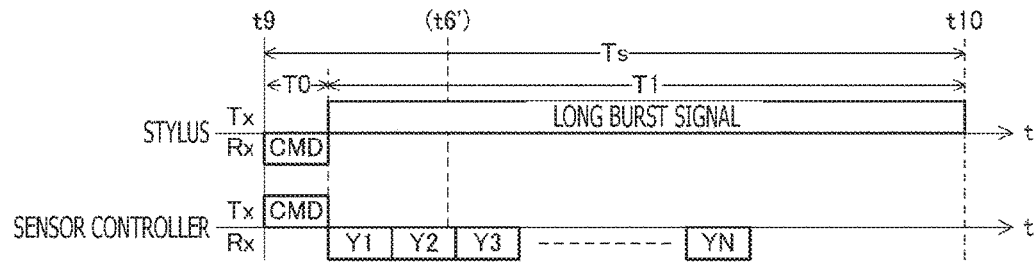
(b)
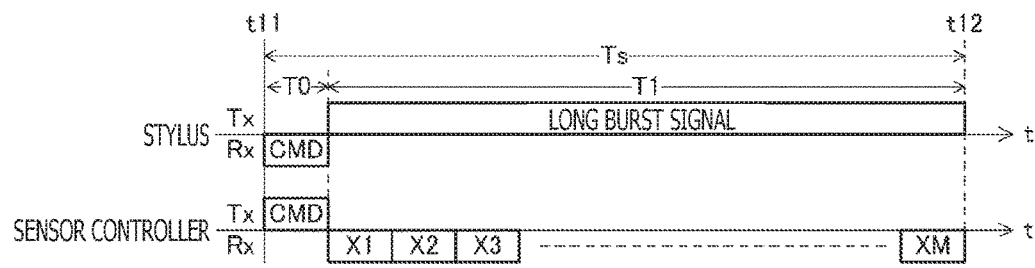
(c)
FIG.6
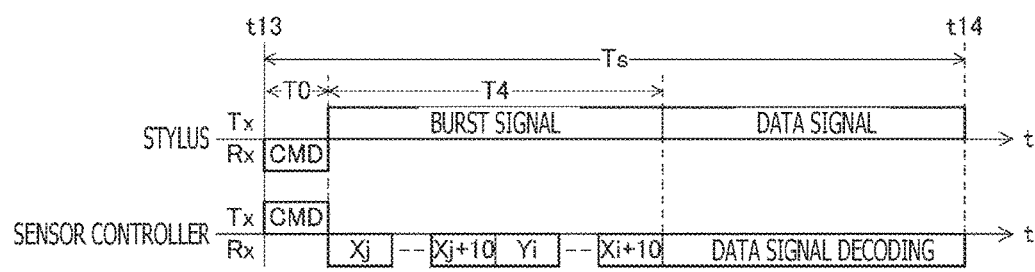

FIG.7
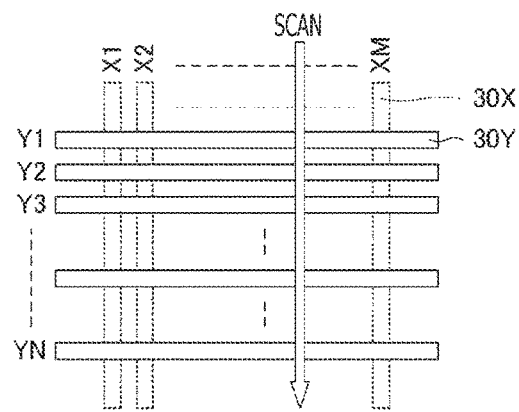
(a)
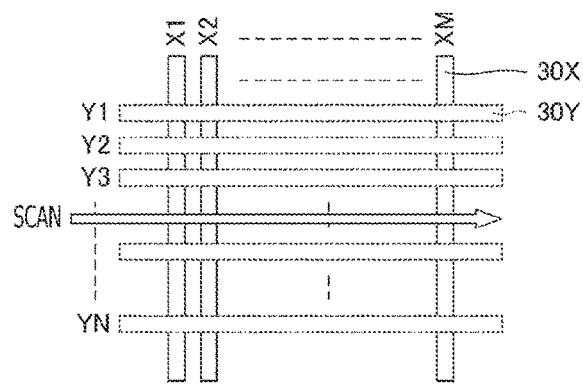
(b)
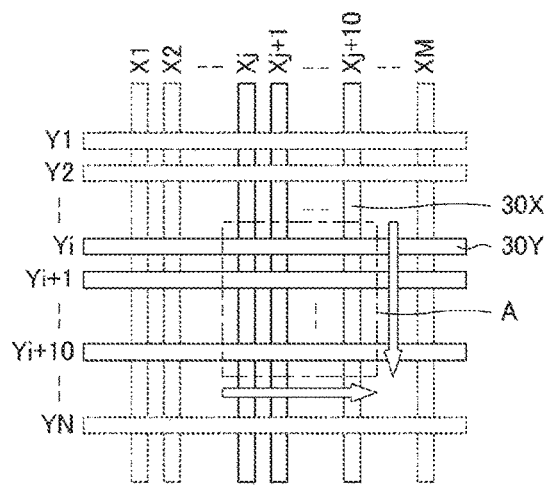
(c)

STYLUS AND SENSOR CONTROLLER

BACKGROUND

Technical Field

The present disclosure relates to a stylus and a sensor controller, and more particularly to a stylus that sends downlink signals while hovering, and a sensor controller that receives such downlink signals.

Description of the Related Art

There is a stylus capable of sending, to a sensor controller, a position detecting signal (position signal) and a signal including various data such as a unique IDentification (ID), a pen pressure, etc. (data signal). Signals that a stylus sends to a sensor controller will hereinafter be collectively referred to as "downlink signals." Patent Documents 1 through 3 disclose examples of styluses that send downlink signals.

When a user of a stylus tries to input characters and pictures using the stylus, the stylus gradually approaches the touch surface of an electronic device including a sensor controller until finally the core body of the stylus contacts the touch surface. Characters and pictures can be entered through the stylus while the core body of the stylus is held in contact with the touch surface. The state in which the core body of the stylus is held in contact with the touch surface will hereinafter be referred to as "contact" state, whereas the state in which the core body of the stylus is not yet in contact with the touch surface as "hover" state.

Patent Document 2 discloses a stylus that suppresses the intensity of a position signal sent from the stylus in contact state to a smaller value than the intensity of a position signal sent from the stylus in hover state (Patent Document 2, paragraph 4, line 57 through paragraph 5, line 3).

Patent Document 3 discloses a stylus that sends a position signal and only some additional signals intermittently in predetermined periodic cycles in hover state and sends a signal representing a pen pressure in the intervals (gaps) in contact state (Patent Document 3, paragraph 13, line 33 through paragraph 14, line 46, FIGS. 9A through 9C).

PRIOR ART DOCUMENT

Patent Documents

Patent Document 1: PCT Patent Publication No. WO2015/111159
Patent Document 2: U.S. Pat. No. 8,773,405
Patent Document 3: U.S. Pat. No. 8,536,471

BRIEF SUMMARY

Technical Problems

Comparison of the signal/noise (S/N) ratios of downlink signals received by a sensor in the touch surface between when the stylus is in hover state and when the stylus is in contact state indicates that the S/N ratio is smaller when the stylus is in hover state. This is because when the stylus is in hover state, the stylus is spaced from the sensor by a larger distance, and the downlink signal is attenuated to a greater extent. According to the conventional art, as a result, the sensor controller may fail to receive the downlink signal while the stylus is in hover state. It has been desirous of address this technical challenge.

The technology disclosed in Patent Document 2 may be considered to be able to lower the possibility of a failure to receive the downlink signal while the stylus is in hover state because the intensity of a downlink signal while the stylus is in hover state is made stronger than the intensity of a downlink signal while the stylus is in contact state. However, the technology suffers from another problem in that the stylus requires a special transmitter capable of sending signals with a variable intensity.

Therefore, it is an aspect of the present disclosure to provide a stylus and a sensor controller which are capable of lowering the possibility of a failure to receive downlink signals when the stylus is in hover state even though the stylus sends the downlink signals with the same intensity as when the stylus is in contact state.

Technical Solution

A stylus according to an aspect of the present disclosure includes a core body, an electrode disposed adjacent to the core body, a transmitter that sends a signal including a first digital value using the electrode, and a controller that controls the transmitter. The controller determines whether the stylus is in contact state in which the core body is held in contact with an operating surface or the stylus is in hover state in which the core body is not held in contact with the operating surface, controls the transmitter to send the first digital value at a first bit rate if the result of the determination indicates the contact state, and controls the transmitter to send the first digital value at a second bit rate smaller than the first bit rate if the result of the determination indicates the hover state.

A stylus according to another aspect of the present disclosure includes a core body, an electrode disposed adjacent to the core body, a transmitter that sends a signal including a first digital value using the electrode, and a controller that controls the transmitter. The controller controls the transmitter to send the signal in units of a superframe including a predetermined number of frames. The controller controls the transmitter to send, in each of the predetermined number of frames, a frame index number representing order of the frames in the superframe.

A stylus according to still another aspect of the present disclosure includes a core body, an electrode disposed adjacent to the core body, a transmitter that sends a signal including a first digital value using the electrode, and a controller that determines whether the stylus is in contact state in which the core body is held in contact with an operating surface or the stylus is in hover state in which the core body is not held in contact with the operating surface. The controller controls the transmitter to send the first digital value according to a first signal transmission process if the result of the determination indicates the contact state, and controls the transmitter to send the first digital value according to a second signal transmission process whose decoding error rate is smaller than the first signal transmission process if the result of the determination indicates the hover state.

A sensor controller according to the present disclosure acquires state information of a stylus from a signal received from the stylus according to a first demodulation process. If the state information indicates that the stylus is in hover state, the sensor controller acquires a first digital value to be included subsequently to the state information according to the first demodulation process. If the state information indicates that the stylus is in contact state, the sensor controller acquires the first digital value to be included subsequently to the state information according to a second demodulation process whose bit error rate is higher than the first demodulation process.

Advantageous Effects

According to the present disclosure, since the noise resistance in hover state is improved, there are obtained advantages including a reduction in the non-detection ratio of downlink signals, a reduction in the bit error detection ratio at the time downlink signals are modulated or decoded, and a reduction in the decoding error ratio while taking error correction into consideration. Thus, even if downlink signals are sent with the same transmission intensity as in contact state, the possibility of a failure to receive downlink signals in hover state can be lowered.

According to the present disclosure, furthermore, since each frame has a frame index number, when the stylus sends one piece of information as divided over a plurality of frames, the sensor controller on a reception side can correctly recover the information on the basis of the frame index numbers even when the divided information is received out of order.

BRIEF DESCRIPTION OF THE DRAWINGS

FIG. 1 is a diagram depicting an arrangement of an electronic device 3 according to an embodiment of the present disclosure. FIG. 1(a) depicts a mode of operation of the electronic device 3 for detecting a touch by a finger F, and FIG. 1(b) depicts a mode of operation of the electronic device 3 for detecting a stylus 2.

FIG. 3 is a diagram depicting configurations of a long burst signal, a burst signal, and a data signal that are sent by the stylus 2 according to the embodiment of the present disclosure.

FIG. 4 is a diagram depicting sequences of signals sent and received between the stylus 2 and a sensor controller 31 when the stylus 2 is above an uplink detection height AH. FIG. 4(a) depicts the sequence in which the sensor controller 31 sends a pen trigger signal, and FIG. 4(b) depicts the sequence in which the sensor controller 31 requests that a long burst signal be sent.

FIG. 5 is a diagram depicting sequences of signals sent and received between the stylus 2 and the sensor controller 31 when the stylus 2 is within a sensing range SR and the sensor controller 31 has not yet identified the position of the stylus 2. FIG. 5(a) depicts the sequence in which the sensor controller 31 sends a pen trigger signal, FIG. 5(b) depicts the sequence in which the sensor controller 31 receives a long burst signal sent by the stylus 2, using linear electrodes 30Y, and FIG. 5(c) depicts the sequence in which the sensor controller 31 receives a long burst signal sent by the stylus 2, using linear electrodes 30X.

FIG. 6 is a diagram depicting a sequence of signals sent and received between the stylus 2 and the sensor controller 31 when the stylus 2 is within the sensing range SR and after the sensor controller 31 has identified the position of the stylus 2. FIG. 6 depicts the sequence in which the stylus 2 sends a burst signal and a data signal (data to be sent is not a unique ID) in hover state.

FIG. 7 is a diagram illustrative of the manner in which the sensor controller 31 operates according to the embodiment of the present disclosure. FIG. 7(a) depicts a first half of a full-range scanning process, FIG. 7(b) depicts a latter half of the full-range scanning process, and FIG. 7(c) depicts a sector scanning process.

DETAILED DESCRIPTION

Figure 2:
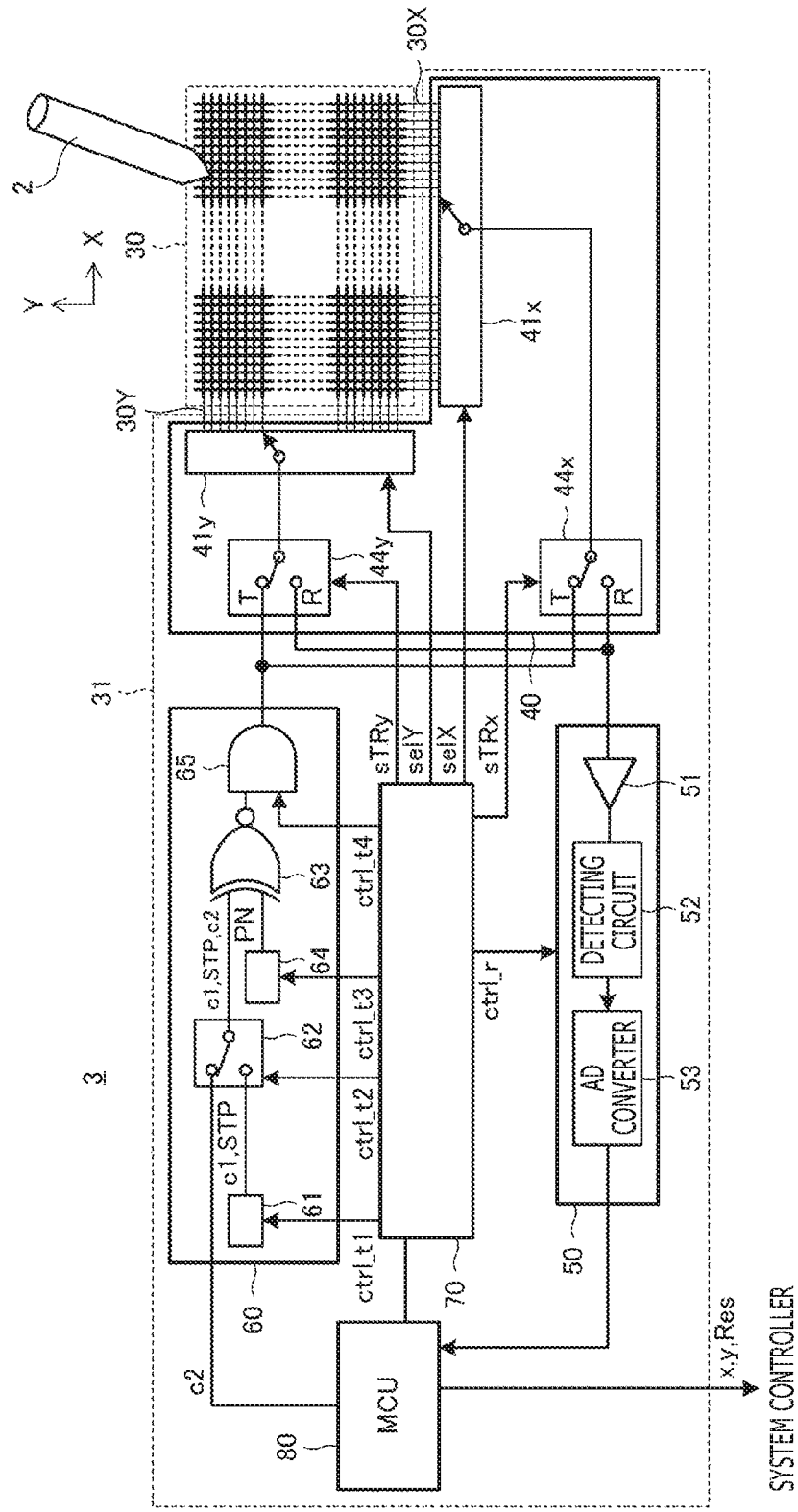
FIG. 2 is a diagram depicting an arrangement of the electronic device 3 according to the embodiment of the present disclosure.

An embodiment of the present disclosure will be described in detail below with reference to the accompanying drawings. First, an outline of arrangements and operation of a stylus 2 and a sensor controller 31 according to the present embodiment will be described below with reference to FIGS. 1 through 8, and then operation of the stylus 2 and the sensor controller 31 related to the features of the present disclosure will be described below with reference to FIGS. 9 through 19.

FIG. 1 is a diagram depicting an arrangement of an electronic device 3 according to the present embodiment. The electronic device 3 is a computer having a touch surface (operating surface) such as a tablet terminal, for example, and includes a sensor 30 and a sensor controller 31, as depicted in FIG. 1.

The sensor 30 includes a matrix of electrodes including M linear electrodes 30X (first electrodes) and N (N<M) linear electrodes 30Y (second electrodes) that are disposed inside the touch surface. According to a specific example, M=72, N=46. The M linear electrodes 30X extend at equal intervals in a first direction parallel to the touch surface. The N linear electrodes 30Y extend at equal intervals in a second direction parallel to the touch surface and perpendicular to the first direction. The linear electrodes 30X and the linear electrodes 30Y are respectively connected to the sensor controller 31.

The sensor 30 is disposed in combination with a display panel (not depicted) such as a liquid crystal display panel or the like. The sensor 30 may be combined with the sensor 30 in desired specific layouts. For example, those layouts include the out-cell type in which the linear electrodes 30X and 30Y are disposed outside the display panel, the on-cell type in which the linear electrodes 30X and 30Y are disposed on a color filter glass panel or substrate glass panel within the display panel, and the in-cell type in which drive electrodes (specifically, common electrodes or pixel electrodes) of the display panel double as the linear electrodes 30X or 30Y.

The sensor controller 31 is a controller that detects, via the sensor 30, a touch by a finger F (also deriving positional coordinates of finger F on the touch surface) and detecting, via the sensor 30, the stylus 2 (also deriving positional coordinates of the stylus 2 on the touch surface), in a time-division fashion.

FIG. 1(a) depicts a mode of operation of the electronic device 3 for detecting a touch by finger F. As depicted in FIG. 1(a), for detecting a touch by finger F, the sensor controller 31 supplies the linear electrodes 30Y successively with a predetermined signal (hereinafter referred to as "finger detecting signal") and successively scans potentials of the linear electrodes 30X to detect the finger detecting signal that has reached the linear electrodes 30X via the intersections between the linear electrodes 30Y and 30X. The amplitude of the finger detecting signal that is detected in this manner is smaller when finger F is close to the intersection via which the finger detecting signal has passed, than when finger F is not close to the intersection. This is because part of the electric current that flows through the linear electrodes 30X and 30Y flows toward the human body via capacitive coupling between finger F and the linear electrodes 30X and 30Y. The sensor controller 31 detects a touch by finger F by detecting this change in the amplitude.

FIG. 1(b) depicts a basic mode of operation of the electronic device 3 for detecting the stylus 2. As depicted in FIG. 1(b), in the basic mode of operation for detecting the stylus 2, the sensor controller 31 performs a detecting operation on a signal (hereinafter referred to as "downlink signal") sent by the stylus 2, using the linear electrodes 30X and 30Y successively as reception electrodes. The sensor controller 31 detects the stylus 2 based on the detected downlink signal. In actual operation, there is a situation in which the sensor controller 31 detects the stylus 2 using only some of the linear electrodes 30X and 30Y. Such a situation will be described later.

In order for the sensor controller 31 to detect the stylus 2, it is necessary for the stylus 2 to be so close to the touch surface of the electronic device 3 that the sensor controller 31 can receive the downlink signal. A sensing range SR that is illustrated in FIG. 1(b) is a schematic representation of a range in which the sensor controller 31 can receive the downlink signal. When the stylus 2 enters the sensing range SR, the sensor controller 31 detects the downlink signal, thereby detecting the stylus 2. The movement of the stylus 2 from outside the sensing range SR into the sensing range SR will hereinafter be referred to as "pen-down." The pen-down is usually performed by an action of the user to bring the stylus 2 closer to the touch surface of the electronic device 3. The hover state described above is a state in which the stylus 2 has entered the sensing range SR by way of pen-down, but has not yet been in contact with the touch surface.

Even when the stylus 2 is outside the sensing range SR, there are instances in which the stylus 2 is able to receive signals (hereinafter referred to as "uplink signals") that the sensor controller 31 has sent to the stylus 2. This is because some uplink signals (a pen trigger signal, a command signal that instructs the stylus 2 to send a long burst signal, etc. to be described later) are sent using the touch surface in its entirety (all of the linear electrodes 30X or all of the linear electrodes 30Y or both of them). An uplink detection height AH that is also illustrated indicates a limitation on the height (distance from the touch surface) up to which the stylus 2 can receive those uplink signals. The uplink detection height AH is at a position higher (a position farther from the touch surface) than the upper limit of the sensing range SR.

FIG. 2 is a diagram depicting an arrangement of the electronic device 3 according to the present embodiment. The linear electrodes 30X and the linear electrodes 30Y of the sensor 30 form capacitive coupling with the stylus 2 and with finger F. When finger F approaches the sensor 30, part of an electric current flowing from the sensor controller 31 to the linear electrodes 30Y is drawn into finger F through the capacitive coupling. Since the amplitude of the finger detecting signal detected by the linear electrodes 30X is now reduced, as described above, the sensor controller 31 is able to detect a touch by finger F. The sensor 30 is arranged to be able to send and receive signals bidirectionally to and from the stylus 2 through the capacitive coupling.

As depicted in FIG. 2, the sensor controller 31 includes a transmitter 60, a selector 40, a receiver 50, a logic unit 70, and a micro controller unit (MCU) 80.

The transmitter 60 is a circuit that generates a finger detecting signal at the timing to detect a touch by finger F, and generates uplink signals at the timing to detect the stylus 2. The uplink signals include a pen trigger signal that lets the stylus 2 know the existence of the sensor controller 31 and a command signal representing a command for the stylus 2.

FIG. 2 illustrates in detail the transmitter 60 including functional blocks involved in the generation of uplink signals. The functional blocks include a pattern supply 61, a switch 62, a spreading processor 63, a code train holder 64, and a transmission guard 65. In the present embodiment, the pattern supply 61 will be described as included in the transmitter 60. However, the pattern supply 61 may be included in the MCU 80.

The pen trigger signal includes a repetition of a predetermined detection pattern c1 and a predetermined delimiter pattern STP at the end.

The detection pattern c1 is a pattern of symbol values used for the stylus 2 to detect the existence of the sensor controller 31, and is known to the stylus 2 in advance (before the stylus 2 detects the sensor controller 31). A symbol is a unit of information used for modulation in a transmission process (a unit of information represented by a transmission signal), and is a unit of information obtained by demodulating one symbol, as a reception signal, in a reception process. The symbol values may include a value that is converted into a bit train by the stylus 2 having received a symbol (hereinafter referred to as "bit train correlated value") and a value that is not converted into a bit train by the stylus 2 (hereinafter referred to as "bit train uncorrelated value"). According to a specific example, the detection pattern c1 includes a pattern "PM" made up of two (2) bit train uncorrelated values "P" and "M."

The delimiter pattern STP is a pattern of symbol values for notifying the stylus 2 of the end of the repetition period of the detection pattern c1, and includes a pattern that does not appear in the repetition of the detection pattern c1. The delimiter pattern STP is also known to the stylus 2 in advance (before the stylus 2 detects the sensor controller 31). According to an example, if the detection pattern c1 includes a pattern "PM" made up of two bit train uncorrelated values "P" and "M," as described above, then the delimiter pattern STP may include a pattern "PP" made up of two consecutive bit train uncorrelated values "P." The delimiter pattern STP and the detection pattern c1 may be switched around such that the delimiter pattern STP includes a pattern "PM" and the detection pattern c1 includes a pattern "PP."

The pattern supply 61 holds the detection pattern c1 and the delimiter pattern STP, and outputs these patterns in a predetermined order in accordance with the instruction of a control signal ctrl_t1 supplied from the logic unit 70. Specifically, the pattern supply 61 repeatedly outputs the detection pattern c1 in succession (continuously) during a predetermined successive transmission period, and outputs the delimiter pattern STP immediately after the successive transmission period is finished. In this manner, the pen trigger signal is sent. The delimiter pattern STP may be output at the beginning of a command signal indicating an instruction to send a long burst signal, to be described later.

The switch 62 has a function to select either the pattern supply 61 or the MCU 80 based on a control signal ctrl_t2 supplied from the logic unit 70, and to supply an output signal from the selected one to the spreading processor 63. If the switch 62 selects the pattern supply 61, then the spreading processor 63 is supplied with the detection pattern c1 or the delimiter pattern STP from the pattern supply 61. If the switch 62 selects the MCU 80, then the spreading processor 63 is supplied with control information c2 from the MCU 80.

The control information c2 includes information representing an instruction (command) for the stylus 2, and is generated by the MCU 80. The command signal described above includes the control information c2. The control information c2 is different from the detection pattern c1 and the delimiter pattern STP in that it includes symbol values (for example, 0 through 15) correlated to a variable-length bit train and these symbol values are not shared with the stylus 2 in advance.

The code train holder 64 has a function to generate and hold a spread code PN of a predetermined chip length having autocorrelation characteristics, on the basis of a control signal ctrl_t3 supplied from the logic unit 70. The spread code PN held by the code train holder 64 is supplied to the spreading processor 63.

The spreading processor 63 has a function to obtain a transmission chip train having a predetermined chip length by modulating the spread code PN held by the code train holder 64 on the basis of the symbol values (the detection pattern c1, the delimiter pattern STP, or the control information c2) supplied via the switch 62. The spreading processor 63 supplies the acquired transmission chip train to the transmission guard 65.

The transmission guard 65 has a function to insert a guard period (a period in which neither transmission nor reception is carried out) that is required to switch between a transmission operation and a reception operation, between a transmission period for uplink signals and a reception period for downlink signals, on the basis of a control signal ctrl_t4 supplied from the logic unit 70.

The receiver 50 is a circuit that receives a finger detecting signal sent by the transmitter 60 or downlink signals sent by the stylus 2 on the basis of a control signal ctrl_r from the logic unit 70. Specifically, the receiver 50 includes an amplifying circuit 51, a detecting circuit 52, and an analog-to-digital (AD) converter 53.

The amplifying circuit 51 amplifies and outputs a signal (a finger detecting signal or downlink signals) supplied from the selector 40. The detecting circuit 52 is a circuit that generates a voltage commensurate with the level of an output signal from the amplifying circuit 51. The AD converter 53 is a circuit that generates a digital signal by sampling the voltage output from the detecting circuit 52 at predetermined time intervals. The digital signal output by the AD converter 53 is supplied to the MCU 80.

A signal receiving process performed by the detecting circuit 52 includes a process of detecting a signal during a period that depends on a length of the period of a signal sent by the stylus 2 (a first bit rate and a second bit rate to be described later), depending on the whether the stylus is in hover state or in contact state. The MCU 80 acquires data sent by the stylus 2 (switch information SW1, etc. to be described later) by determining the bit value of a signal according to a demodulation process that corresponds to a modulation process used according to whether the stylus is in hover state or in contact state. If an error detecting code is included in a frame sent by the stylus 2, then the MCU 80 detects errors (or corrects errors) based on the error detecting code in demodulating data sent by the stylus 2 (switch information SW1, etc. to be described later).

The selector 40 includes switches 44$x$ and 44$y$ and conductor selecting circuits 41$x$ and 41$y$.

The switches 44$x$ and 44$y$ include one-circuit two-contact switch elements, where a common terminal is selectively connected to either one of T terminal and R terminal. The common terminal of the switch 44$x$ is connected to the conductor selecting circuit 41$x$, T terminal of the switch 44$x$ is connected to the output terminal of the transmitter 60, and R terminal of the switch 44$x$ is connected to the input terminal of the receiver 50. The common terminal of the switch 44$y$ is connected to the conductor selecting circuit 41$y$, T terminal thereof is connected to the output terminal of the transmitter 60, and R terminal thereof is connected to the input terminal of the receiver 50.

The conductor selecting circuit 41$x$ is a switch element for selectively connecting the M linear electrodes 30X to the common terminal of the switch 44$x$. The conductor selecting circuit 41$x$ is capable of connecting some or all of the M linear electrodes 30X simultaneously to the common terminal of the switch 44$x$.

The conductor selecting circuit 41$y$ is a switch element for connecting the N linear electrodes 30Y selectively to the common terminal of the switch 44$y$. The conductor selecting circuit 41$y$ is arranged to be able to connect some or all of the N linear electrodes 30Y simultaneously to the common terminal of the switch 44$y$.

The selector 40 is supplied with four control signals sTRx, sTRy, selX, and selY from the logic unit 70. Specifically, the control signal sTRx is supplied to the switch 44x, the control signal sTRy to the switch 44y, the control signal selX to the conductor selecting circuit 41x, and the control signal selY to the conductor selecting circuit 41y. The logic unit 70 controls the selector 40 using these control signals sTRx, sTRy, selX, and selY to send and receive a finger detecting signal, send uplink signals including a pen trigger signal and a command signal, and receive downlink signals. The controlling of the selector 40 by the logic unit 70 will be described in greater detail later.

The logic unit 70 and the MCU 80 serve as a controller that controls the transmitter 60, the receiver 50, and the selector 40, to thereby control transmitting and receiving operation of the sensor controller 31. Specifically, the MCU 80 includes a microprocessor that has a read-only memory (ROM) and a random-access memory (RAM) therein and operates according to predetermined programs. The logic unit 70 is arranged to output control signals described above under the control of the MCU 80. The MCU 80 is arranged to perform a process of deriving coordinate data x and y indicating the position of finger F or the stylus 2 on the basis of a digital signal supplied from the AD converter 53 and outputting the derived coordinate data x and y to a system controller of the electronic device 3. The MCU 80, if the digital signal supplied from the AD converter 53 indicates a data signal, performs a process of acquiring data Res represented by the digital signal and outputting the acquired data Res to the system controller of the electronic device 3.

The controlling of the selector 40 by the logic unit 70 will be described in specific detail below.

For sending and receiving a finger detecting signal, the logic unit 70 controls the selector 40 using the control signals sTRx, sTRy, selX, and selY, so that N linear electrodes 30Y are successively connected to the output terminal of the transmitter 60 and the M linear electrodes 30X are successively connected to the input terminal of the receiver 50. As depicted in FIG. 1, it is possible to supply a finger detecting signal successively to the N linear electrodes 30Y and detect, with the receiver 50, the finger detecting signal that has reached the linear electrodes 30X through the intersections of the linear electrodes 30Y and 30X, thereby detecting a touch by finger F.

For sending uplink signals and receiving downlink signals, the logic unit 70 performs different processes depending on the manner in which the stylus 2 is detected and the types of downlink signals. The types of downlink signals and sequences of signals sent and received between the stylus 2 and the sensor controller 31 will first be described below, and then the manner in which the logic unit 70 operates to send uplink signals and receive downlink signals will be described in detail.

FIG. 3 is a diagram depicting the types of downlink signals sent by the stylus 2 according to the embodiment of the present disclosure. As depicted in FIG. 3, the downlink signals include a long burst signal, a burst signal, and a data signal. The long burst signal includes a signal having a predetermined waveform as a predetermined pattern known in advance between the stylus 2 and the sensor controller 31. The long burst signal is sent continuously over a predetermined time period T1. The burst signal includes the above signal having the predetermined waveform, but is sent continuously over a predetermined time period T4 shorter than the time period T1. The data signal includes a data signal generated by modulating the above signal having the predetermined waveform with data. Typically, the data signal is sent subsequently to the burst signal over a time period corresponding to the difference, T1-T4, between the time period T4 and the time period T1. Actually, however, there is an instance in which the transmission of the data signal continues over a time longer than the difference T1-T4, as described later. A predetermined gap signal (not depicted) for delimiting the burst signal is inserted at the beginning of the burst signal. The types of the downlink signals to be sent by the stylus 2 are selected according to the instruction of command signals sent by the sensor controller 31.

FIGS. 4 through 6 are diagrams depicting sequences of signals sent and received between the stylus 2 and the sensor controller 31. FIG. 4 depicts the sequences when the stylus 2 is above the uplink detection height AH, FIG. 5 depicts the sequences when the stylus 2 is within the sensing range SR and the sensor controller 31 has not yet identified the position of the stylus 2, and FIG. 6 depicts the sequence when the stylus 2 is within the sensing range SR and the sensor controller 31 has identified the position of the stylus 2. These sequences will be respectively described below.

<When the Stylus 2 is Above the Uplink Detection Height AH>

FIG. 4(a) depicts the sequence in which the sensor controller 31 sends a pen trigger signal and FIG. 4(b) depicts the sequence in which the sensor controller 31 requests that a long burst signal be sent.

As depicted in FIG. 4(a), the sensor controller 31 sends a pen trigger signal over a time period Ts (=t1−t0) from time t0 to time t1. The sensor controller 31 sends the pen trigger signal when it has not yet detected the stylus 2. As described above, the pen trigger signal includes a repetition of a predetermined detection pattern c1 and a predetermined delimiter pattern STP at the end. The stylus 2 intermittently performs a detecting operation to detect the detection pattern c1 by intermittently performing a detecting operation to detect the symbols ("P" and "M" in the above example) of the detection pattern c1. If the stylus 2 is above the uplink detection height AH, then it cannot detect the detection pattern c1 with its detecting operation. Therefore, the stylus 2 simply repeats the detecting operation to detect the detection pattern c1.

As depicted in FIG. 4(b), subsequently to the transmission of the pen trigger signal, the sensor controller 31 starts sending a command signal (denoted by "CMD" in FIGS. 4 through 6 and FIG. 10 to be described later) at time t2 subsequent to time t1. The time period required to send the command signal is T0 which is shorter than the time period Ts. When the sensor controller 31 has not yet detected the stylus 2, the sensor controller 31 sends the command signal that instructs the stylus 2 to send a long burst signal. However, the stylus 2 which is above the uplink detection height AH is unable to receive the command signal and does not send a long burst signal in response to the command signal, but simply repeats the detecting operation to detect the detection pattern c1.

After the sensor controller 31 has sent the command signal that instructs the stylus 2 to send a long burst signal, the sensor controller 31 performs a detecting operation to detect a long burst signal. This detecting operation corresponds to the first half of a full-range scanning process to be described later, and is carried out using the N linear electrodes 30Y in succession. Details of the full-range scanning process will be described later. Since the stylus 2 does not send a long burst signal at this time, the sensor controller 31 does not detect a long burst signal. The time period that can be used for the detecting operation to detect a long burst signal is T1 (Ts−T0) corresponding to the difference between the time period Ts and the time period T0. When the detecting operation to detect a long burst signal is performed using the N linear electrodes 30Y in succession, the detecting operation of the long burst signal is temporarily completed at time t3, prior to time t4 (=t2+Ts) at which the time period T1 elapses. The sensor controller 31 that has not detected a long burst signal during the detecting operation enters a sleep mode from time t3 to time t4. The sensor controller 31 thus has its electric power consumption reduced. After time t4, the transmission of a pen trigger signal is repeated.

<When the Stylus 2 is within the Sensing Range SR and the Sensor Controller 31 has not Yet Identified the Position of the Stylus 2>

FIG. 5(a) depicts the sequence in which the sensor controller 31 sends a pen trigger signal, FIG. 5(b) depicts the sequence in which the sensor controller 31 receives a long burst signal sent by the stylus 2, using linear electrodes 30Y, and FIG. 5(c) depicts the sequence in which the sensor controller 31 receives a long burst signal sent by the stylus 2, using linear electrodes 30X.

As depicted in FIG. 5(a), when a pen-down movement is made (time t6), the stylus 2 can detect the detection pattern c1 in its subsequent detecting operation (time t7) to detect the detection pattern c1. Having detected the detection pattern c1, the stylus 2 continues the detecting operation until a delimiter pattern STP is detected. When the delimiter pattern STP is detected, the stylus 2 synchronizes with the sensor controller 31 on the basis of the detection time. The synchronization is carried out by the generation of a transmission and reception schedule to be specifically described later.

FIG. 5(a) depicts an example in which a pen-down movement is made at time t6 between time t5 at which a pen trigger signal starts being sent and time t8 (=t5+Ts) at which the pen trigger signal ends being sent, and the stylus 2 detects the detection pattern c1 at time t7 prior to time t8. The same process is carried out even if a pen-down movement is made (e.g., at time t6' depicted in FIG. 5(b)) while the sensor controller 31 is performing a detecting operation to detect a long burst signal, except that the timing for the stylus 2 to detect the detection pattern c1 is slightly delayed.

Then, as depicted in FIG. 5(b), when the sensor controller 31 starts sending a command signal that instructs the stylus 2 to send a long burst signal at time t9 after time t8, the stylus 2 receives the command signal and continuously sends a long burst signal over a time period T1 until time t10 (=t9+Ts). The sensor controller 31 detects the stylus 2 by detecting the long burst signal thus sent.

Specifically, as depicted in FIG. 5(b), the sensor controller 31 uses the N linear electrodes 30Y in succession to perform a detecting operation to detect a long burst signal (the first half of a full-range scanning process to be described later). At this time, since a long burst signal is detected with either one or more of the linear electrodes 30Y, the sensor controller 31 stores the detected intensity of the long burst signal at each of the linear electrodes 30Y. Then, as depicted in FIG. 5(c), the sensor controller 31 starts again to send a command signal that instructs the stylus 2 to send a long burst signal at time t11 after time t10, and performs again a detecting operation to detect a long burst signal from the end of the transmission of the command signal. This detecting operation is carried out using the M linear electrodes 30X in succession until time t12 (=t11+Ts) (the latter half of a full-range scanning process to be described later). Since a long burst signal is detected with either one or more of the linear electrodes 30X in this detecting operation, the sensor controller 31 stores the detected intensity of the long burst signal at each of the linear electrodes 30X. The sensor controller 31 then derives the positional coordinates of the stylus 2 on the touch surface on the basis of the previously stored detected intensity of the long burst signal at each of the linear electrodes 30Y and the presently stored detected intensity of the long burst signal at each of the linear electrodes 30X.

<When the Stylus 2 is within the Sensing Range SR and after the Sensor Controller 31 has Identified the Position of the Stylus 2>

FIG. 6 depicts the sequence in which the stylus 2 sends a burst signal and a data signal (data to be sent are not a unique ID) in hover state. Sequences of signals at the time the stylus 2 is in contact state and at the time data to be sent is a unique ID will be described in detail later.

As depicted in FIG. 6, the sensor controller 31 that has identified the position of the stylus 2 starts sending a command signal that instructs the stylus 2 to send data at subsequent time t13. In response to the command signal, the stylus 2 continuously sends a burst signal over time period T4. The sensor controller 31 detects the burst signal, and derives positional coordinates of the stylus 2 on the basis of the detected burst signal. The detecting operation to detect the burst signal is carried out successively using only those of the M linear electrodes 30X and the N linear electrodes 30Y which are indicated as being in the vicinity of the stylus 2 by the positional coordinates of the stylus 2 that have been derived at the last time (i.e. a sector scanning process, to be described later). The stylus 2 sends a data signal including data that it has been instructed to send, subsequently to the burst signal. The sensor controller 31 receives the data signal and decodes the data signal to acquire the data sent by the stylus 2. The reception of the data signal is carried out using only one linear electrode 30X or linear electrode 30Y that corresponds to the positional coordinates of the stylus 2 that have been derived at the last time.

Referring back to FIG. 2, operation of the logic unit 70 at the time of detecting the stylus 2 and performing bidirectional communication with the stylus 2 will be described in detail below with reference to FIG. 2.

For sending a pen trigger signal and a command signal that instructs the stylus 2 to send a long burst signal (FIGS. 4(a) and 4(b) and FIGS. 5(a), 5(b) and 5(c)), the logic unit 70 controls the selector 40 to use all of the M linear electrodes 30X or all of the N linear electrodes 30Y or both of them simultaneously. Specifically, the logic unit 70 controls the selector 40 with the control signals sTRx, sTRy, selX, and selY so that the output terminal of the transmitter 60 is connected to the M linear electrodes 30X or the N linear electrodes 30Y or both. Therefore, a pen trigger signal and a command signal that instructs the stylus 2 to send a long burst signal are sent using the touch surface in its entirety, thereby allowing the stylus 2 to receive these signals no matter where it may be located in the sensing range SR depicted in FIG. 1.

For receiving a long burst signal when the stylus 2 has not yet been detected (FIG. 4(b) and FIG. 5(b)), the logic unit 70 controls the selector 40 to use the N linear electrodes 30Y in succession, as depicted in FIG. 4(b) and FIG. 5(b). Specifically, the logic unit 70 controls the selector 40 using the control signals sTRy and selY to connect the N linear electrodes 30Y successively to the input terminal of the receiver 50. The sensor controller 31 can thus receive a long burst signal sent by the stylus 2, thereby detecting the stylus 2 no matter where it may be located in the sensing range SR depicted in FIG. 1.

FIG. 7(a) is a diagram illustrative of the manner in which the sensor controller 31 operates in such a case. As depicted in FIG. 7(a), the sensor controller 31 successively scans the N linear electrodes 30Y. The sensor controller 31 does not scan the M linear electrodes 30X at this time because it is possible to scan the entire surface of the sensor 30 using only the N linear electrodes 30Y and, in addition, in order to increase the scanning time period per electrode.

For receiving a long burst signal when positional coordinates of the stylus 2 have not yet been derived after having detected the stylus 2 by receiving a long burst signal (FIG. 5(c)), the logic unit 70 controls the selector 40 to use the M linear electrodes 30X in succession, as depicted in FIG. 5(c). Specifically, the logic unit 70 controls the selector 40 using the control signals sTRx and selX to connect the M linear electrodes 30X successively to the input terminal of the receiver 50. The sensor controller 31 derives positional coordinates of the stylus 2 on the touch surface in the manner described above on the basis of the results of the control of the selector 40 and the previous detection of the long burst signal with the N linear electrodes 30Y.

FIG. 7(b) is a diagram illustrative of the manner in which the sensor controller 31 operates in such a case. As depicted in FIG. 7(b), the sensor controller 31 successively scans the M linear electrodes 30X. In the present description, the scanning process that successively uses the N linear electrodes 30Y (the first half) as depicted in FIG. 7(a) and the scanning process that successively uses the M linear electrodes 30X (the latter half) as depicted in FIG. 7(b) are combined together into a process referred to as "full-range scanning process."

For sending a command signal after having derived positional coordinates of the stylus 2 (FIG. 6), the logic unit 70 controls the selector 40 to use only those of the M linear electrodes 30X and the N linear electrodes 30Y which are in the vicinity of the stylus 2. Specifically, if the stylus 2 is positioned at the intersection of the (j+5)th linear electrode 30X and the (i+5)th linear electrode 30Y, for example, then the logic unit 70 controls the selector 40 using the control signals sTRx, sTRy, selX, and selY so that five linear electrodes, for example, on each of both sides of the intersection, i.e., the jth to (j+10)th linear electrodes 30X and the ith to (i+10)th linear electrodes 30Y, are simultaneously connected to the output terminal of the transmitter 60. Since the sensor controller 31 can now send a command signal using only those linear electrodes in the vicinity of the stylus 2, the electric power consumption required to send a command signal is reduced. If the palm of a hand or the like placed on the touch surface is supplied with a command signal, then the ground potential supplied to the stylus 2 may increase, possibly resulting in a reduction in the accuracy with which the stylus 2 detects an uplink signal. However, inasmuch the sensor controller 31 sends a command signal using only those linear electrodes in the vicinity of the stylus 2, as described above, the possibility that the palm of a hand or the like will be supplied with a command signal is low, and hence the accuracy with which the stylus 2 detects an uplink signal will not be lowered.

For receiving a normal burst signal rather than a long burst signal after having derived positional coordinates of the stylus 2 (FIG. 6), the logic unit 70 controls the selector 40 to use only those of the M linear electrodes 30X and the N linear electrodes 30Y which are in the vicinity of the stylus 2. Specifically, if the stylus 2 is positioned at the intersection of the (j+5)th linear electrode 30X and the (i+5)th linear electrode 30Y, for example, then the logic unit 70 controls the selector 40 using the control signals sTRx, sTRy, selX, and selY so that five linear electrodes, for example, as depicted in FIG. 6, on each of both sides of the intersection, i.e., the jth to (j+10)th linear electrodes 30X and the ith to (i+10)th linear electrodes 30Y, are successively connected to the input terminal of the receiver 50. Since the reception time period per linear electrode is thus increased, it is possible to receive a burst signal reliably.

FIG. 7(c) is a diagram illustrative of the manner in which the sensor controller 31 operates in such a case. In this example, it is assumed that the stylus 2 is positioned at the intersection of the (j+5)th linear electrode 30X and the (i+5)th linear electrode 30Y. The sensor controller 31 successively scans only 11 linear electrodes 30X ranging from the jth to (j+10)th linear electrodes 30X and 11 linear electrodes 30Y ranging from the ith to (i+10)th linear electrodes 30Y, among the M×N linear electrodes, and derives positional coordinates of the stylus 2 on the basis of the results of the scanning process. The scanning process in which both of some of the M linear electrodes X and some of the N linear electrodes Y are used to re-derive (update) positional coordinates of the stylus 2 that have been derived once is referred to as "sector scanning process."

For receiving a data signal (FIG. 6), the logic unit 70 controls the selector 40 to use only one linear electrode 30X or linear electrode 30Y corresponding to the position of the stylus 2 derived from the last burst signal. Specifically, the logic unit 70 controls the selector 40 using the control signals sTRx, sTRy, selX, and selY so that one linear electrode 30X or linear electrode 30Y is connected to the input terminal of the receiver 50. It is now possible to utilize the data signal transmission time period (=T1–T4) to the fullest for the purpose of sending data from the stylus 2 to the sensor controller 31.

The operation of the logic unit 70 for detecting the stylus 2 and performing bidirectional communication with the stylus 2 has been described above.

Figure 8:
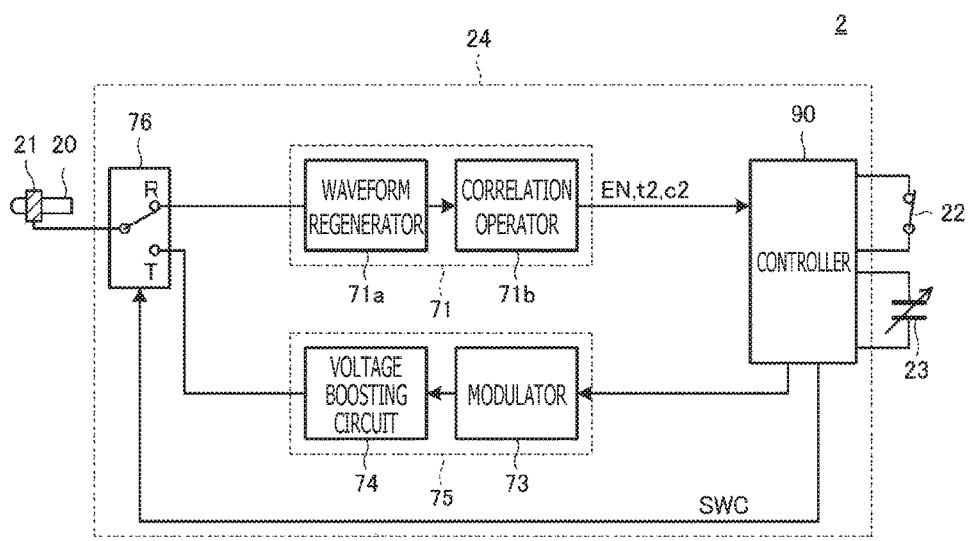
FIG. 8 is a diagram depicting an arrangement of the stylus 2 according to the embodiment of the present disclosure.

FIG. 8 is a block diagram depicting functional blocks of the stylus 2 according to the present embodiment. As depicted in FIG. 8, the stylus 2 includes a core body 20, an electrode 21, a switch 22, a pen pressure detection sensor 23 (pen pressure detector), and a signal processor 24.

The core body 20 is an insulative member serving as a pen tip of the stylus 2. The electrode 21 is a conductive member provided adjacent to the core body 20 (particularly in the vicinity of the distal end thereof). The electrode 21 serves as an antenna that sends downlink signals and also as an antenna for receiving uplink signals sent from the sensor controller 31 via the capacitive coupling. An electrode that sends downlink signals and an electrode for receiving uplink signals may be combined as one electrode or may be separate from each other.

The switch 22 includes a switch that can be turned on or off by the user, and may be a side switch mounted on a side surface of the stylus 2 or a tail switch mounted on a rear end of the stylus 2. The pen pressure detection sensor 23 is a pressure sensor for detecting a pressure (pen pressure) applied to the distal end of the core body 20.

The signal processor 24 has a function to receive uplink signals from the sensor controller 31 via the electrode 21, perform processing sequences depending on the contents of the received uplink signals, generate downlink signals to be sent to the sensor controller 31, and send the generated downlink signals to the sensor controller 31 via the electrode 21. Specifically, the signal processor 24 functionally includes a switch 76, a receiver 71, a transmitter 75, and a controller 90. These functional blocks will be described below in order.

The switch 76 includes a one-circuit two-contact switch element where a common terminal is selectively connected to either one of T terminal and R terminal. The common terminal of the switch 76 is connected to the electrode 21, T terminal thereof is connected to the output terminal of the transmitter 75, and R terminal thereof is connected to the input terminal of the receiver 71. The state of the switch 76 is controlled by control signals SWC from the controller 90. For receiving uplink signals from the sensor controller 31, the controller 90 controls the switch 76 with the control signal SWC so that R terminal and the common terminal are connected to each other. For sending downlink signals to the sensor controller 31, the controller 90 controls the switch 76 with the control signal SWC so that T terminal and the common terminal are connected to each other. In an initial state, i.e., during a period until the stylus 2 detects the detection pattern c1 described above, the controller 90 controls the switch 76 to keep R terminal and the common terminal connected to each other, and then enters a sleep mode for reducing the electric power consumed by the stylus 2.

The receiver 71 is a circuit that receives a signal supplied from the switch 76 (a signal that has reached the electrode 21) and decodes the symbol values contained in the received signal. The receiver 71 includes a waveform regenerator 71a and a correlation operator 71b. The receiver 71 is arranged to be able to detect a detection pattern c1, a delimiter pattern STP, and control information c2 described above by decoding the symbol values. Until the receiver 71 detects a detection pattern c1, it performs its receiving operation only intermittently in order to reduce the electric power consumed by the stylus 2.

The waveform regenerator 71a binarizes the level of an electric charge (voltage) induced in the electrode 21 with a clock that is several times (e.g., four times) the chip rate of the spread code PN described above, shapes the binarized level into a binary train (chip train) having positive and negative polarity values, and outputs the chip train. The correlation operator 71b stores the chip train output from the waveform regenerator 71a into a register, performs a correlation operation on the chip train while successively shifting it with the above clock with respect to the spread code PN (or a code produced by inverting and/or cyclically shifting the spread code PN), thereby decoding the symbol values contained in the received signal.

The receiver 71 sequentially determines whether the symbol values decoded by the correlation operator 71b represent the detection pattern c1 or not. If the receiver 71 detects the detection pattern c1 as a result, then the receiver 71 detects the existence of the sensor controller 31 and issues a trigger signal EN, which makes it possible to perform a process depending on the command represented by the command signal, to the controller 90.

When the receiver 71 has detected the detection pattern c1, it switches from the intermittent receiving operation to a continuous receiving operation, and sequentially determines whether the decoded symbol values represent the delimiter pattern STP or not. If the receiver 71 detects the delimiter pattern STP as a result, then the receiver 71 outputs detection time t2 to the controller 90.

After having detected the delimiter pattern STP, the receiver 71 performs a receiving operation to receive a command signal sent by the sensor controller 31 according to a schedule (to be described later) from the controller 90. Specifically, the receiver 71 acquires a string of symbol values decoded by the correlation operator 71b during the receiving operation, as control information c2, and outputs the acquired control information c2 to the controller 90.

The controller 90, which includes a microprocessor (MCU), is activated upon the supply of a trigger signal EN from the receiver 71, and generates a transmission and reception schedule for various signals on the basis of detection time t2 supplied from the receiver 71. Then, the controller 90 performs a process of generating control signals SWC based on the generated transmission and reception schedule and supplying the generated control signals SWC to the switch 76, a process of controlling the receiver 71 to receive command signals, and a process of controlling the transmitter 75 on the basis of control information c2 supplied from the receiver 71.

The process performed by the controller 90 to control the transmitter 75 includes determining the kind of a signal (either one of signals (A) through (F) depicted in FIG. 10 to be described later) to be sent to the sensor controller 31 on the basis of a received command signal. If a data signal representing certain data is to be sent, the controller 90 acquires data which it is instructed to send by control information c2 and supplies the acquired data to the transmitter 75. The data supplied to the transmitter 75 include a unique ID of the stylus 2 which is stored in a memory, not depicted, data indicating whether the switch 22 is turned on or off, and data representing the pen pressure detected by the pen pressure detection sensor 23, etc.

For controlling the transmitter 75 to send a data signal, the controller 90 determines whether the stylus 2 is in contact state or in hover state, and performs a process of controlling a bit rate depending on the result of the determination. Specifically, if the result of the determination indicates a contact state, then the controller 90 controls the transmitter 75 to send at least part of the data to be sent at a first bit rate, and if the result of the determination indicates a hover state, then the controller 90 controls the transmitter 75 to send at least part of the data to be sent at a second bit rate that is lower (smaller) than the first bit rate. This process will be described in greater detail later.

The transmitter 75 is a circuit that generates signals to be sent to the sensor controller 31 and supplies the generated signals to the electrode 21, and includes a modulator 73 and a voltage boosting circuit 74. The transmitter 75 supplies signals to be sent to the electrode 21, to thereby perform a process of sending the signals including data to be sent using the electrode 21.

The modulator 73 is a circuit that generates a carrier signal (e.g., a rectangular-wave signal) having a predetermined frequency or a frequency controlled by the controller 90, and outputs the carrier signal as it is or after modulating it under the control of the controller 90. When a long burst signal or a burst signal is to be sent, the modulator 73 does not modulate the carrier signal and outputs the carrier signal as it is, or modulates the carrier signal with a pattern of known values shared with the sensor controller 31 and outputs the modulated carrier signal. In this manner, the modulator 73 outputs a long burst signal prior to being boosted or outputs a burst signal prior to being boosted. When a data signal is to be sent, the modulator 73 modulates the carrier signal with data supplied from the controller 90 (by way of on/off keying (OOK), phase shift keying (PSK), or the like), and outputs the modulated signal obtained as a result. In this manner, the modulator 73 outputs a data signal prior to being boosted.

The voltage boosting circuit 74 is a circuit that boosts the voltage of output signals from the modulator 73 to a certain amplitude, to thereby generate a long burst signal, a burst signal, and a data signal. The long burst signal, the burst signal, and the data signal that have been generated by the voltage boosting circuit 74 are supplied via the switch 76 to the electrode 21, from which they are transmitted into space.

The outline of the arrangements and the operation of the stylus 2 and the sensor controller 31 according to the present embodiment has been described above with reference to FIGS. 1 through 8. Now, operation of the stylus 2 and the sensor controller 31 related to the features of the present disclosure will be described in detail below with reference to FIGS. 9 through 19.

Figure 9:
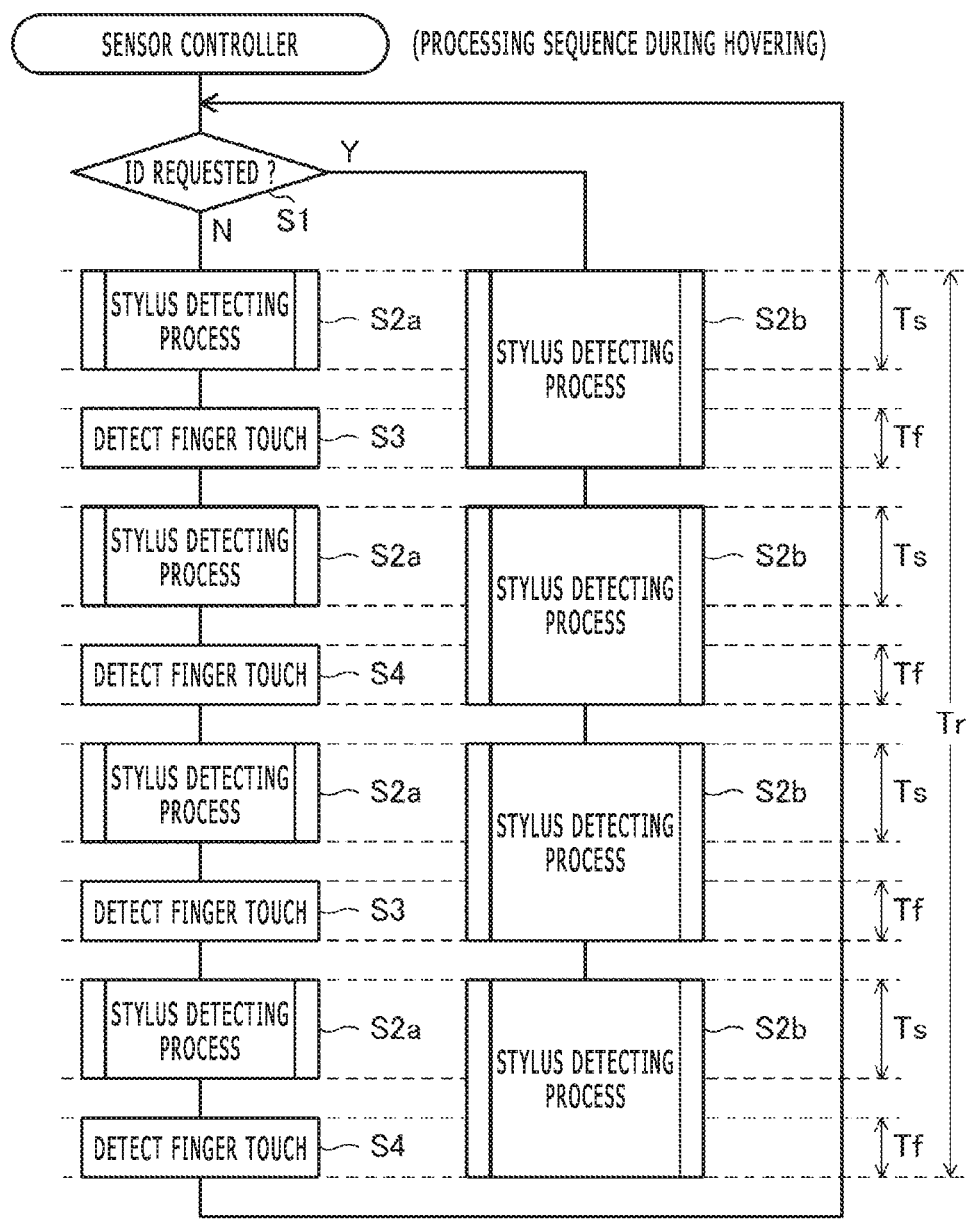
FIG. 9 is a flowchart of an overall processing sequence performed by the sensor controller 31 while the stylus 2 is hovering, according to the embodiment of the present disclosure.

FIG. 9 is a flowchart of an overall processing sequence that the sensor controller 31 performs. In FIG. 9, however, only the processing sequence at the time the stylus 2 is in hover state is illustrated by way of example. As depicted in FIG. 9, the sensor controller 31 is arranged to repeat the same operation in each time period Tr (e.g., 16.67 ms which is a reciprocal of 60 Hz), which is defined as the reciprocal of a display refresh rate of a display panel disposed together with the sensor 30.

In each periodic cycle, the sensor controller 31 first determines whether it has requested the stylus 2 to send a unique ID or not (step S1). The request is made by sending a command signal that instructs the stylus 2 to send a unique ID.

If the sensor controller 31 determines that it has not requested the stylus 2 in step S1, then the sensor controller 31 performs a stylus detecting process (step S2a) and a finger touch detecting process (steps S3 and S4) alternately each for four times. Each stylus detecting process is continuously carried out over a time period Ts (2500 μs, for example, which is the same as the time period Ts depicted in FIGS. 4 through 6), and each finger touch detecting process is continuously carried out over a time period Tf (e.g. 1500 μs). For detecting finger F, two finger touch detecting processes (step S3 and step S4) that are performed separately before and after a stylus detecting process are carried out as a single finger touch position detecting unit.

If the sensor controller 31 determines that it has requested the stylus 2 in step S1, then the sensor controller 31 performs a stylus detecting process (step S2b) repeatedly for four times. Each stylus detecting process is continuously carried out over a time period Ts+Tf. Since no finger touch detecting process is carried out, no input with from finger F depicted in FIG. 1(a) is possible while the stylus detecting process is repeatedly performed. The time period over which the stylus detecting process is continued is increased while limiting input with finger F because the size of a unique ID is so large that a long period of time is needed to send the entire unique ID from the stylus 2 to the sensor controller 31. A unique ID may be sent once per pen-down movement, and it is considered that a user typically does not make an input with finger F at the same time as a pen-down movement of the stylus 2. Furthermore, the restrictive time period continues for only the time period Tr (e.g., 16.67 ms). For these reasons, the restriction on input with finger F in favor of the transmission of a unique ID is considered to not adversely affect the user's usage of the sensor.

Hereinafter, each periodic cycle commensurate with the time period Ts+Tf will be referred to as "frame," and each periodic cycle commensurate with the time period Tr (operational periodic cycle of a display process of the display panel) will be referred to as "superframe." In other words, the stylus 2 according to the present embodiment sends downlink signals in the unit of a superframe, and also in the unit of a frame. In the example depicted in FIG. 9, one superframe includes four frames. However, the number of frames included in one superframe is not limited to four. A "frame" and a "superframe" including a plurality of frames may be rephrased as a "packet" and a "frame" including a plurality of packets, respectively.

Figure 10:
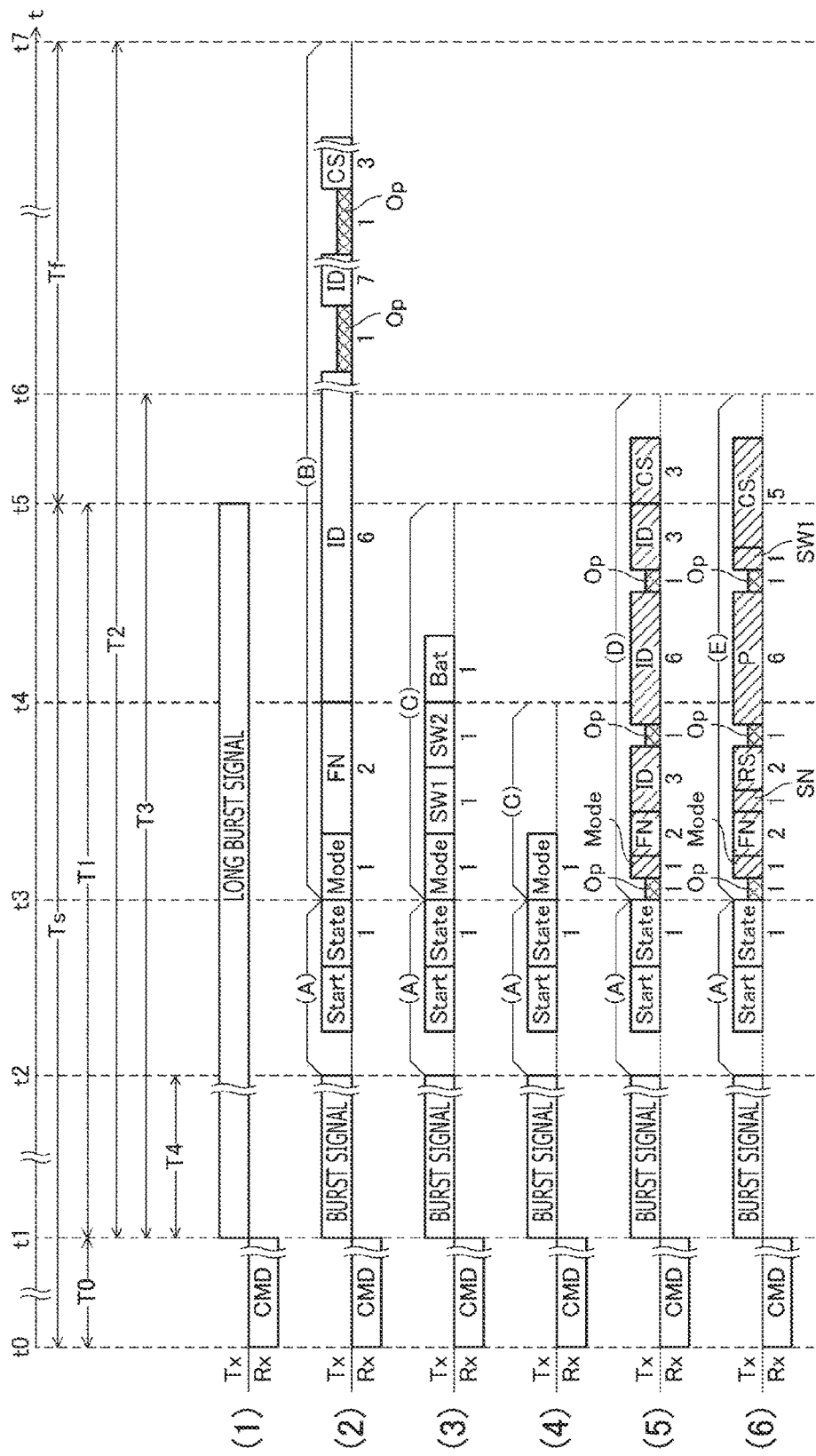
FIG. 10 is a diagram depicting a format of downlink signals that is sent by the stylus 2 according to the embodiment of the present disclosure.

FIG. 10 is a diagram depicting a format of downlink signals that are sent by the stylus 2 while the sensor controller 31 is performing stylus detecting processes. As described above, the downlink signals include a long burst signal, a burst signal, and a data signal. FIG. 10 depicts five types of data (A) through (E) as data sent by the data signal. For the sake of brevity, the transmission of a data signal may be referred to as "transmission of data" below.

Data (D) and (E) depicted hatched with lines slanting down to the right in FIG. 10 are sent while the stylus 2 is in contact state, and are sent by the stylus 2 at the first bit rate. Data (B) and (C) are sent while the stylus 2 is in hover state, and are sent by the stylus 2 at the second bit rate that is smaller than the first bit rate. Data (A) is sent regardless of whether the stylus 2 is in hover state or in contact state, and is sent by the stylus 2 at the second bit rate. The present disclosure is primarily characterized in that the bit rates of data (A) through (E) are controlled in this manner.

Details of operation of the sensor controller 31 and the stylus 2 will be described below with reference to FIG. 10 and flowcharts of processing sequences of the sensor controller 31 and the stylus 2.

Figure 11:
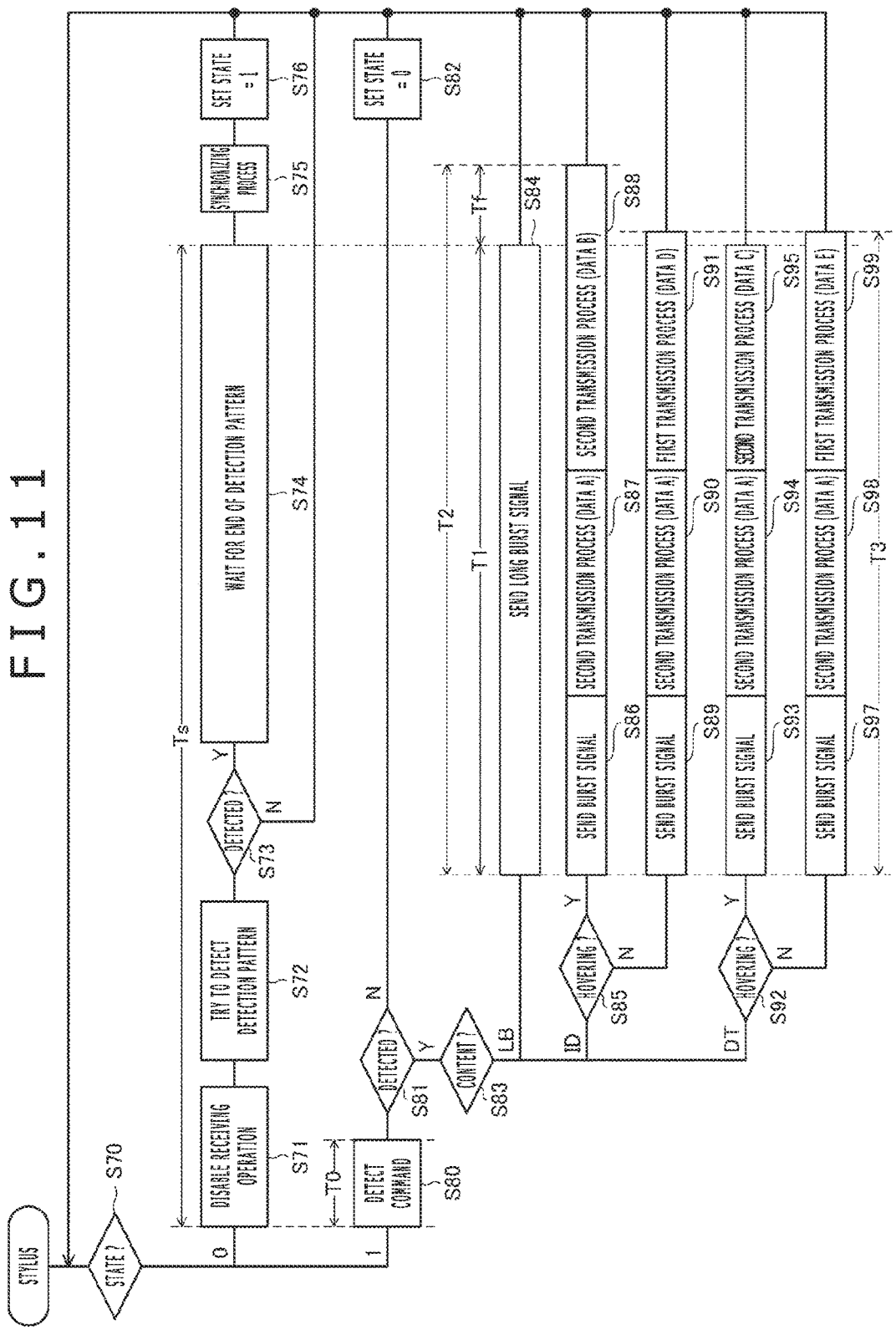
FIG. 11 is a flowchart of a process of receiving uplink signals and a process of sending downlink signals, which are carried out by the stylus 2 according to the embodiment of the present disclosure.

FIG. 11 is a flowchart of a process of receiving uplink signals and a process of sending downlink signals, which are carried out by the stylus 2. Operation of various components (particularly, the receiver 71, the transmitter 75, and the controller 90) of the stylus 2 depicted in FIG. 8 will be described in detail below with reference to FIG. 11.

Although not depicted, the controller 90 of the stylus 2 stores therein a state flag that indicates its own states. The states that can be indicated by the state flag include a sensor controller undetected state (=0) and a sensor controller detected state (=1). The controller 90 refers to the state flag (step S70) at the start timing of a frame described above, and controls the transmitter 75 to send signals in each frame.

If the state flag referred to in step S70 indicates "0," then the receiver 71 of the stylus 2 enters a receiving operation disabled state (step S71). After a predetermined time period has elapsed, the receiver 71 tries to detect a detection pattern c1 described above (step S72). The disabled period is provided in step S71 in order to reduce the electric power consumed by the stylus 2 by intermittently performing the detecting operation to detect a detection pattern c1.

Then, the receiver 71 determines whether a detection pattern c1 has been detected by the detecting operation tried in step S72 (step S73). If the receiver 71 determines that a detection pattern c1 has not been detected as a result, then control goes back to step S70. If the receiver 71 determines that a detection pattern c1 has been detected, then the receiver 71 issues a trigger signal EN depicted in FIG. 8 to activate the controller 90, and continues a detecting operation to detect symbols of a detection pattern c1 and a delimiter pattern STP until a delimiter pattern STP is detected (step S74). If a delimiter pattern STP is detected, then the receivers 71 outputs detection time t2 (FIG. 8) to the controller 90. In response to detection time t2, the controller 90 performs a process of synchronizing with the sensor controller 31 (specifically, a process of generating a transmission and reception schedule described above) on the basis of detection time t2 (step S75), and sets the state flag to "1" (step S76), after which control goes back to step S70.

If the state flag referred to in step S70 indicates "1," then the controller 90 performs a detecting operation to detect a command signal (step S80). The detecting operation is specifically an operation in which the controller 90 is supplied with control information c2 (FIG. 8) from the receiver 71, and is carried out over the time period T0 (e.g., 200 μs) depicted in FIGS. 4 through 6. Then, the controller 90 determines whether a command signal has been detected by the detecting operation in step S80 (step S81). If the controller 90 determines that a command signal has not been detected, then the controller 90 sets the state flag to "0" (step S82), after which control goes back to step S70. Step S82 indicates a process in which the stylus 2 fails to detect uplink signals for the reason that the stylus 2 has moved out of the uplink detection height AH depicted in FIG. 1, for example.

If the controller 90 determines that a command signal has been detected in step S81, then the controller 90 determines the content of the detected command signal (the content of a command from the sensor controller 31) (step S83). Specifically, the content of the command signal indicates a command (LB) to send a long burst signal, a command (ID) to send a unique ID, or a command (DT) to send data other than a unique ID.

If the controller 90 determines that the content of the command signal indicates a command (LB) to send a long burst signal in step S83, then the controller 90 controls the transmitter 75 to send a long burst signal (step S84). More specifically, the controller 90 controls the transmitter 75 to send a long burst signal over a time period T1 from time t1 to time t5 after having received the command signal sent over a time period T0 from time t0 to time t1, as depicted at (1) in FIG. 10. As described above with reference to FIG. 4, T1=Ts−T0. Thereafter, the controller 90 returns control to step S70, as depicted in FIG. 11.

If the controller 90 determines that the content of the command signal indicates a command (ID) to send a unique ID in step S83, then the controller 90 determines whether the stylus 2 is in hover state or not (step S85). This determining process is carried out by referring to the pen pressure that is being detected by the pen pressure detection sensor 23 depicted in FIG. 8. Specifically, the controller 90 determines that the stylus 2 is in hover state if the pen pressure that is being detected by the pen pressure detection sensor 23 is zero, and determines that the stylus 2 is not in hover state (the stylus 2 is in contact state) if the pen pressure that is being detected by the pen pressure detection sensor 23 is larger than zero.

If the controller 90 determines that the stylus 2 is in hover state in step S85, then the controller 90 controls the transmitter 75 to send a burst signal (step S86) and then send data (A) and data (B) according to a second transmission process (steps S87 and S88).

As depicted at (2) in FIG. 10, data (A) includes data including a burst signal, a predetermined start flag Start, and state information State including 1-bit information that indicates the result of the determination (the hover state or the contact state) in step S85. In this case, the state information State indicates the hover state. The controller 90 controls the transmitter 75 to send the burst signal over a time period T4 from time t1 to time t2 (see FIG. 3) and, thereafter, send the start flag Start and the state information State successively in this order until subsequent time t3 according to the second transmission process. The second transmission process is a method of sending each bit at the second bit rate described above. For sending each bit, the second transmission process uses a second time period (e.g., 90 μs) longer than a first time period (e.g., 30 μs) used in a first transmission process to be described later. A gap time period having a predetermined time length is inserted between the burst signal and the start flag Start.

As depicted at (2) in FIG. 10, data (B) includes data including mode information Mode, a frame index number FN, part of a unique ID, and a check sum CS. The controller 90 controls the transmitter 75 to send these items of information in this order according to the second transmission process as with data (A) immediately after time t3 when the transmission of the state information State is finished until time t7 where the frame ends. With data (B) being thus sent, the time period required from the start of reception of the command signal until the end of the transmission of data (B) is represented by Ts+Tf, which fails to provide time periods for detecting a finger touch as depicted in FIG. 9. In this case, therefore, the sensor controller 31 is unable to detect a finger touch.

The components of data (B) will be described in detail. The mode information Mode is 1-bit information indicating the type of data (a unique ID or other data) that is about to be sent. In data (B), the type of data indicated by the mode information Mode is "unique ID."

The frame index number FN is 2-bit information indicating the order of frames in a superframe, and indicates which frame in one superframe the presently performed stylus detecting process belongs to.

The unique ID is 52-bit information that differs from stylus to stylus. The 52-bit information is information that is very large in size for information to be sent by the stylus 2, and cannot be fully sent in one frame. Therefore, it is divided among the frames in one superframe and then sent. Specifically, the unique ID is divided into units of 13 bits each and sent on all four frames in one superframe. The frame index number FN is used for the sensor controller 31 to recover the unique ID that has been sent as divided pieces.

Inverted bits Op are placed among and immediately after the unique ID. Each of the inverted bits Op includes a bit that is generated by inverting the last one of a predetermined number of bits. The controller 90 controls the transmitter 75 to send an inverted bit Op immediately after this predetermined number of bits. In the example depicted at (2) in FIG. 10, one inverted bit Op is placed immediately after 6 bits of the unique ID and one inverted bit Op is placed immediately after 7 subsequent bits of the unique ID. An inverted bit Op is added to prevent more than a predetermined number of identical bits from continuing.

The check sum CS is an error detecting code calculated on the basis of data (e.g., 13 bits of the unique ID) included in the same data (B). Though the number of bits of the check sum CS is arbitrary, it is illustrated as 3 in FIG. 10. The controller 90 calculates a check sum CS when generating data (B), for example, and places the calculated check sum CS at the end of data (B). The sensor controller 31 calculates a check sum CS on its own after it has received the unique ID, and compares it with the received check sum CS to determine whether the unique ID has been received correctly or not.

Referring back to FIG. 11, if the controller 90 determines that the stylus 2 is in contact state in step S85, then the controller 90 controls the transmitter 75 to send a burst signal (step S89), then send data (A) according to the second transmission process (step S90), and subsequently send data (D) according to the first transmission process (step S91).

The content of data (A) is configured as described above. However, the state information State in this case indicates the contact state.

As depicted at (5) in FIG. 10, data (D) is a signal including mode information Mode, a frame index number FN, part of a unique ID, and a check sum CS. The type indicated by the mode information Mode is "unique ID." Data (D) includes inverted bits Op inserted in a total of three locations, i.e., at the start of data (D) and two locations in the unique ID (more specifically, immediately after 3 bits of the unique ID and immediately after 6 subsequent bits of the unique ID).

The number of bits of the unique ID sent with one item of data (D) is 12. The check sum CS is a 3-bit error detecting code calculated on the basis of 12 bits of the unique ID included in the same data (D), for example. As is the case with data (B), the unique ID is divided among and sent on all four frames in one superframe. However, since the total number of bits of the unique ID is 52 as described above, when 12 bits are assigned per frame, there occurs a shortage of 4 bits. 4 bits of the unique ID will be sent as a serial number SN in data (E) to be described later.

The controller 90 controls the transmitter 75 to send the respective items of information of data (D) in the above-described order according to the first transmission process immediately after time t3 when the transmission of the state information State is finished until time t6. The first transmission process is a method of sending each bit at the first bit rate described above. For sending each bit, the first transmission process uses a first time period of 30 µs, for example. The time length of 30 µs is ⅓ of the second time period used in the second transmission process. Time t6 is slightly later than time t5 (earlier than time t7 when the frame ends) at which the stylus detecting process ends when sending a long burst signal. A time period T3 (=t6−t1) required to send the burst signal, data (A), and data (D) is slightly longer than the time period T1 required to send the long burst signal. With data (D) being thus sent, although part of the time period for detecting a finger touch as depicted in FIG. 9 is consumed in the transmission and reception of data (D), the time period for detecting a finger touch is encroached on only slightly, so that the sensor controller 31 is able to detect a finger touch.

Referring back to FIG. 11, if the controller 90 determines that the content of the command signal indicates a command (DT) to send data other than a unique ID in step S83, then the controller 90 determines whether the stylus 2 is in hover state or not (step S92). The details of the determination in step S92 are the same as those in step S85, and will not be described below.

If the controller 90 determines that the stylus 2 is in hover state in step S92, then the controller 90 controls the transmitter 75 to send a burst signal (step S93) and then send data (A) and data (C) consecutively according to the second transmission process (steps S94 and S95).

The content of data (A) is configured as described above. However, the state information State in this case indicates the hover state.

As depicted at (3) in FIG. 10, data (C) is a signal including mode information Mode, two items of switch information SW1 and SW2, and battery information Bat. Alternatively, as depicted at (4) in FIG. 10, data (C) is a signal including only mode information Mode. In this case, the type of data indicated by the mode information Mode is "other data." The first item of switch information SW1 is 1-bit information indicating whether the switch 22 depicted in FIG. 8 is turned on or off (first digital value). As can be understood from (3) in FIG. 10, the state information State is placed before the switch information SW1 in one frame. According to the present embodiment, the second item of switch information SW2 is kept in reserve and is not actually used. The battery information Bat is 1-bit information indicating the available amount of electric energy stored in a cell (not depicted) for energizing the stylus 2. The battery information Bat indicates the available amount of electric energy stored in the cell by way of how often the bit becomes "1" in a plurality of transmission events.

The controller 90 controls the transmitter 75 to send data (C) depicted at (3) in FIG. 10 in the first and third frames in one superframe, and controls the transmitter 75 to send data (C) depicted at (4) in FIG. 10 in the second and fourth frames in one superframe. The content of data to be sent is thus varied depending on the frame because priority is given to the reduction of the electric power consumed by the stylus 2 in view of the fact that there is no need to send the switch information SW1 and SW2 and the battery information Bat at a high rate.

With respect to data (C) depicted at (3) in FIG. 10, the controller 90 controls the transmitter 75 to send the items of information making up data (C) in the order described above according to the second transmission process immediately after time t3 when the transmission of the state information State is finished until time t5. Therefore, the time period required to send the burst signal, data (A), and data (C) is T1 that is the same as the time period required to send a long burst signal. With respect to data (C) depicted at (4) in FIG. 10, the controller 90 controls the transmitter 75 to send the mode information Mode of data (C) according to the second transmission process immediately after time t3 when the transmission of the state information State is finished until time t4 (between time t3 and time t5). In the latter case, the controller 90 is in a sleep mode during a time period from time t4 to time t5, reducing as much electric power consumed by the stylus 2.

Referring back to FIG. 11, if the controller 90 determines that the stylus 2 is in contact state in step S92, then the controller 90 controls the transmitter 75 to send a burst signal (step S97), then send data (A) according to the second transmission process (step S98), and further send data (E) according to the first transmission process (step S99).

The content of data (A) is configured as described above. However, the state information State in this case indicates the contact state.

As depicted at (6) in FIG. 10, data (E) is a signal including mode information Mode, a frame index number FN, a serial number SN, reserved information RS, pen pressure data P, switch information SW1, and a check sum CS. In this case, the type of data indicated by the mode information Mode is "other data." Data (E) includes inverted bits Op inserted in a total of three locations, i.e., at the start of data (E), immediately after the reserved information RS, and immediately after the pen pressure data P.

The serial number SN is represented by 4 bits of information out of the 52 bits of the unique ID, as described above, and is used for the sensor controller 31 to identify a plurality of styluses 2 which are in use with the same sensor controller 31. The serial number SN may include information that specifies a pen tip setting type representing the setting state of the pen tip of the stylus 2 (pencil, brush, etc.). As with the unique ID, the serial number SN is divided into units of 1 bit each and sent on all four frames in one superframe. The sensor controller 31 stores 48 bits received from data (D) and couples them with 4 bits received from data (E), obtaining the entire unique ID.

The reserved information RS is information that the vender of the stylus 2 can set freely, and 2 bits are reserved therefor.

The pen pressure data P includes 12 bits of data indicating a pen pressure detected by the pen pressure detection sensor 23 (second digital value), and is divided into units of 6 bits each that are placed in two consecutive frames (specifically, the first and second frames or the third and fourth frames in one superframe).

The controller 90 controls the transmitter 75 to send the items of information of data (E) in the above-described order according to the first transmission process immediately after time t3 when the transmission of the state information State is finished until time t6. Therefore, part of the time period for detecting a finger touch as depicted in FIG. 9 is consumed in the transmission and reception of data (E). However, as with data (D), since the time period for detecting a finger touch is encroached on only slightly, the sensor controller 31 is able to detect a finger touch.

As described above, the controller 90 controls the transmitter 75 to selectively send data (A) through (E) depending on commands from the sensor controller 31, and at the same time also controls their bit rates depending on the state of the stylus 2 (the contact state or the hover state). Specifically, the controller 90 makes the bit rate of data (B) and (C) sent in hover state (the second bit rate described above) smaller than the bit rate of data (D) and (E) sent in contact state (the first bit rate described above). The controller 90 also controls the transmitter 75 to send data (A) at the second bit rate as with data (B) and (C) sent in hover state. FIG. 10 depicts an example in which the ratio of the first bit rate and the second bit rate is 3:1. However, the ratio can be changed appropriately. The controller 90 performs such bit rate control in order to improve the noise resistance in hover state in which the S/N ratio of downlink signals tends to be poor and also to allow the sensor controller 31 to receive the state information State reliably particularly with respect to data (A). These aspects will be described again in detail later.

Figure 12:
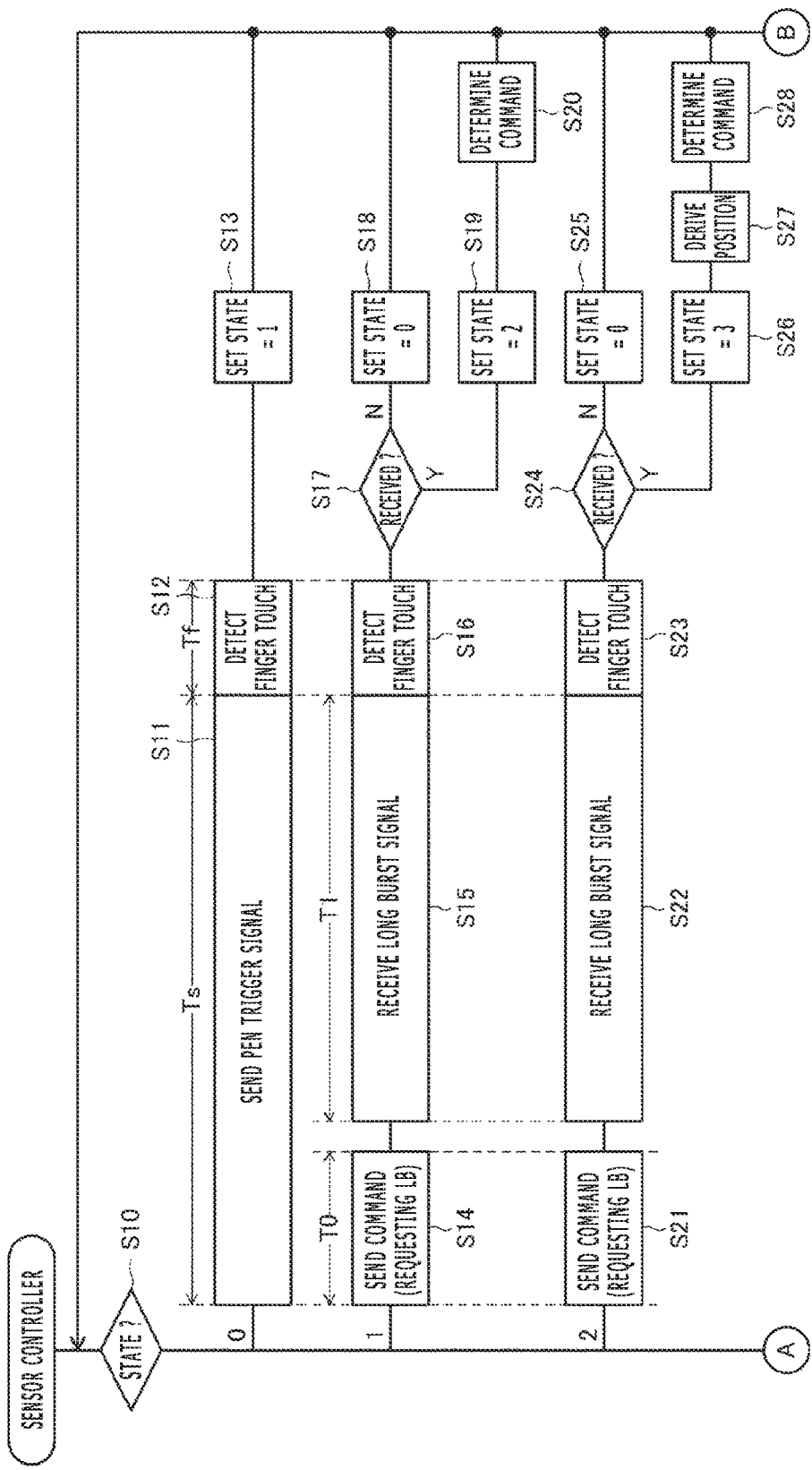
FIG. 12 is a flowchart of a process of sending uplink signals and a process of receiving downlink signals, which are carried out by the sensor controller 31 according to the embodiment of the present disclosure.
Figure 13:
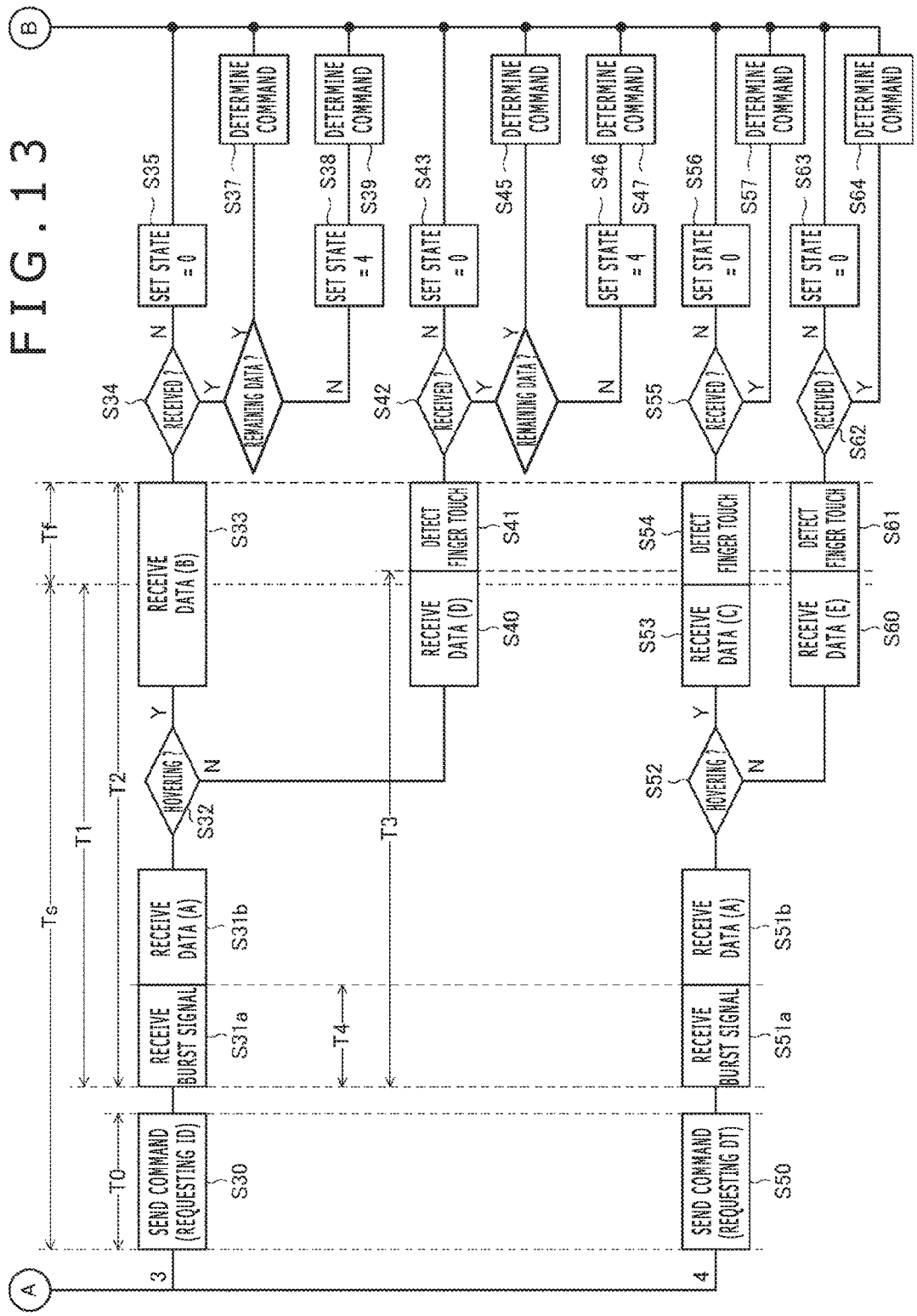
FIG. 13 is a flowchart of the process of sending uplink signals and the process of receiving downlink signals, which are carried out by the sensor controller 31 according to the embodiment of the present disclosure.

FIGS. 12 and 13 are flowcharts of a process of sending uplink signals and a process of receiving downlink signals, which are carried out by the sensor controller 31. The processes of the sensor controller 31 that correspond to the process of the stylus 2 which is depicted in FIG. 11 will be described below with reference to FIGS. 12 and 13.

As with the stylus 2, the sensor controller 31 stores therein a state flag that indicates its own states. The states that can be indicated by the state flag include a stylus undetected and pen trigger signal transmission waiting state (=0), a stylus undetected and response to a pen trigger signal waiting state (=1), a stylus detected and position underived state (=2), a stylus position derived and unique ID unreceived state (=3), and a unique ID received state (=4). The sensor controller 31 initially refers to the state flag (step S10).

If the state flag referred to in step S10 indicates "0," then the sensor controller 31 sends a pen trigger signal over a time period Ts depicted in FIG. 9, etc. (step S11). Specifically, the sensor controller 31 sends a repetition of a detection pattern c1 and a delimiter pattern STP. Having finished the continuous transmission of the pen trigger signal, the sensor controller 31 performs a process of detecting a finger touch over a time period Tf in FIG. 9, etc. (step S12) and sets the state flag to "1" (step S13), after which control goes back to step S10. In FIG. 12, step S12 is followed by step S13. However, these steps may be carried out in parallel to each other. This relationship also holds true for other finger touch detecting processes (steps S16, S23, S41, S54 and S61) to be described later and subsequent processes (e.g., steps S17 through S20 with respect to step S16).

If the state flag referred to in step S10 indicates "1," then the sensor controller 31 sends a command signal that instructs the stylus 2 to send a long burst signal (requesting LB) (step S14). The transmission of various command signals including this command signal takes the time period T0 described above. Thereafter, the sensor controller 31 performs a receiving operation to receive a long burst signal depicted in FIG. 10 over the time period T1 described above (step S15). This receiving operation is performed in the first half of the full-range scanning process described with reference to FIG. 7(a).

When the time period T1 has elapsed and the receiving operation to receive a long burst signal is finished, the sensor controller 31 performs a process of detecting a finger touch over a time period Tf (step S16) and determines whether it has received a long burst signal or not (step S17). If the sensor controller 31 determines that it has not received a long burst signal as a result, then it sets the state flag to "0" (step S18), after which control goes back to step S10. Step S18 indicates a process in which the sensor controller 31 fails to detect downlink signals for the reason that the stylus 2 is outside the sensing range SR depicted in FIG. 1, for example. If the sensor controller 31 determines that it has received a long burst signal in step S17, then it sets the state flag to "2" (step S19) and determines a command to be sent to the stylus (step S20), after which control goes back to step S10. The command that is determined here is a command (LB) that instructs the stylus 2 to send a long burst signal.

If the state flag referred to in step S10 indicates "2," then the sensor controller 31 sends again a command signal that instructs the stylus 2 to send a long burst signal (requesting LB) (step S21). Thereafter, the sensor controller 31 performs a receiving operation to receive a long burst signal over the time period T1 (step S22). This receiving operation is performed in the latter half of the full-range scanning process described with reference to FIG. 7(b). When the operation of the first half of the full-range scanning process (step S15) and the operation of the latter half of the full-range scanning process (step S22) can be carried out in one time period T1, these two steps S15 and S22 may be performed in one process.

When the time period T1 has elapsed and the receiving operation to receive a long burst signal is finished, the sensor controller 31 performs a process of detecting a finger touch over a time period Tf (step S23) and determines whether it has received a long burst signal or not (step S24). If the sensor controller 31 determines that it has not received a long burst signal as a result, then it sets the state flag to "0" (step S25), after which control goes back to step S10. Step S25 indicates a process in which the sensor controller 31 fails to detect downlink signals for the reason that the stylus 2 has left the sensing range SR depicted in FIG. 1, for example. If the sensor controller 31 determines that it has received a long burst signal in step S24, then it sets the state flag to "3" (step S26) and derives the position of the stylus 2 on the basis of the result of the detection of the long burst signal in step S15 and the result of the detection of the long burst signal in step S22 (step S27). The sensor controller 31 then determines a command to be sent to the stylus (step S28), after which control goes back to step S10. The command that is determined here is a command (requesting ID) that instructs the stylus 2 to send a unique ID and that also serves to instruct the stylus 2 to send an ordinary burst signal as opposed to a long burst signal. A command to be sent in step S50 to be described later (a command (requesting DT) that instructs the stylus 2 to send data other than a unique ID) also serves to instruct the stylus 2 to send a burst signal.

If the state flag referred to in step S10 indicates "3," then the sensor controller 31 sends a command signal representing a command determined in step S28 or step S37 or S45 to be described later (step S30). Thereafter, the sensor controller 31 successively performs receiving operations to receive a burst signal and data (A) (steps S31a and S31b). When the sensor controller 31 receives a burst signal, it derives positional coordinates of the stylus 2 on the basis of the detected intensities of the received burst signal at the linear electrodes 30X and 30Y.

The receiving operation to receive a burst signal in step S31a is performed according to the sector scanning process described with reference to FIG. 7(c). The receiving operation to receive data (A) in step S31b is carried out using one linear electrode 30X or linear electrode 30Y selected on the basis of the positional coordinates derived from the detected intensities of the burst signal. The sensor controller 31 acquires data (A) by demodulating the received signal according to a first demodulation process corresponding to the second bit rate described above. These details also apply to the detection of a burst signal and data (A) in steps S51a and S51b to be described later.

Having finished the receiving operations to receive a burst signal and data (A), the sensor controller 31 determines whether the stylus 2 is in hover state or not by confirming the state information State included in data (A) (step S32). If the sensor controller 31 determines that the stylus 2 is in hover state, then the sensor controller 31 performs a receiving operation to receive data (B) (step S33). As described above with reference to FIG. 10, since the transmission of data (B) continues until the time at which the frame ends, the sensor controller 31 does not perform a process of detecting a finger touch.

As with the receiving operation to receive data (A), the receiving operation in step S33 is carried out using one linear electrode 30X or linear electrode 30Y selected on the basis of the positional coordinates derived in step S31. This also holds true for receiving operations to receive data (C) through (E) to be described later (steps S40, S53, and S60). In this manner, it is possible to utilize the time period for detecting data signal to the fullest, so that the sensor controller 31 can send more data to the stylus 2. The sensor controller 31 acquires data (B) by demodulating the received signal according to the first demodulation process described above. This also applies to the receiving operation to receive data (D) to be described later (step S53).

Having finished the receiving operation to receive data (B), the sensor controller 31 determines whether it has received a burst signal, data (A), or data (B) or not (step S34). If the sensor controller 31 determines that it has not received any of them as a result, it sets the state flag to "0" (step S35), after which control returns to step S10. Step S35 indicates a process in which the sensor controller 31 fails to detect downlink signals for the reason that the stylus 2 has left the sensing range SR depicted in FIG. 1, for example. If the sensor controller 31 determines that it has received any one of them in step S34, then the sensor controller 31 determines whether it has received all (52 bits) of the fragments (13-bit data) of a unique ID that can be received via data (B) or not (step S36). If the sensor controller 31 determines that there are some fragments (remaining data) not yet received, then it determines a command that instructs the stylus 2 to send a unique ID (requesting ID) as a command to be sent to the stylus 2 (step S37), after which control goes back to step S10. If the sensor controller 31 determines that it has received all of the fragments (no remaining data) in step S36, then it sets the state flag to "4" (step S38). The sensor controller 31 determines a command that instructs the stylus 2 to send data other than a unique ID (requesting DT) as a command to be sent to the stylus 2 (step S39), and then returns control to step S10.

Although not depicted, the sensor controller 31 then combines the received fragments of a unique ID, to thereby recover the unique ID and store the recovered unique ID, in parallel to the execution of steps S38, S39. In this case, the sensor controller 31 determines the order in which to combine the fragments on the basis of frame index numbers FN sent with the fragments.

If the sensor controller 31 determines that the stylus 2 is not in hover state (is in contact state) in step S32, then the sensor controller 31 performs a receiving operation to receive data (D) (step S40). As depicted in FIG. 13, the receiving operation is carried out in a manner to encroach slightly on the time period reserved for detecting a finger touch. The sensor controller 31 carries out a process of detecting a finger touch using a time period remaining after step S40 (step S41). The sensor controller 31 acquires data (D) by demodulating the received signal according to a second demodulation process corresponding to the first bit rate described above. This detail also applies to a receiving operation to receive data (E) (step S60) to be described later. The second demodulation process is a demodulation process having a higher bit error rate than the first demodulation process.

Having finished the receiving operation to receive data (D), the sensor controller 31 determines whether it has received a burst signal, data (A), or data (D) or not (step S42). If the sensor controller 31 determines that it has not received any of them as a result, it sets the state flag to "0" (step S43), after which control returns to step S10. Step S43 indicates a process in which the sensor controller 31 fails to detect downlink signals for the reason that the stylus 2 has left the sensing range SR depicted in FIG. 1, for example. If the sensor controller 31 determines that it has received any one of them in step S42, then the sensor controller 31 determines whether it has received all (48 bits) of the fragments (12-bit data) of a unique ID that can be received via data (D) or not (step S44). If the sensor controller 31 determines that there are some fragments (remaining data) not yet received, then it determines a command that instructs the stylus 2 to send a unique ID (requesting ID) as a command to be sent to the stylus 2 (step S45), after which control goes back to step S10. If the sensor controller 31 determines that it has received all of the fragments (no remaining data) in step S44, then it sets the state flag to "4" (step S46). The sensor controller 31 determines a command that instructs the stylus 2 to send data other than a unique ID (requesting DT) as a command to be sent to the stylus 2 (step S47), and then control returns to step S10.

If the state flag referred to in step S10 is "4," then the sensor controller 31 sends a command signal representing a command determined in steps S39, S47 or steps S57, S64 to be described later (step S50). Thereafter, the sensor controller 31 successively performs receiving operations to receive a burst signal and data (A) (steps S51a and S51b). When the sensor controller 31 receives a burst signal, it derives positional coordinates of the stylus 2 on the basis of the detected intensities of the received burst signal at the linear electrodes 30X and 30Y.

Having finished the receiving operations to receive a burst signal and data (A), the sensor controller 31 determines whether the stylus 2 is in hover state or not by confirming the state information State included in data (A) (step S52). If the sensor controller 31 determines that the stylus 2 is in hover state, then the sensor controller 31 performs a receiving operation to receive data (C) (step S53).

When the receiving operation to receive data (C) is over, the sensor controller 31 performs a process of detecting a finger touch over a time period Tf (step S54) and determines whether it has received it has received a burst signal, data (A), or data (C) or not (step S55). If the sensor controller 31 determines that it has not received any of them as a result, it sets the state flag to "0" (step S56), after which control returns to step S10. Step S56 indicates a process in which the sensor controller 31 fails to detect downlink signals for the reason that the stylus 2 has left the sensing range SR depicted in FIG. 1, for example. If the sensor controller 31 determines that it has received any one of them in step S55, then the sensor controller 31 determines a command that instructs the stylus 2 to send data other than a unique ID (requesting DT) as a command to be sent to the stylus 2 (step S57), and then control returns to step S10.

If the sensor controller 31 determines that the stylus 2 is not in hover state (is in contact state) in step S52, then the sensor controller 31 performs a receiving operation to receive data (E) (step S60). As depicted in FIG. 13, the receiving operation is carried out in a manner to encroach slightly on the time period kept for detecting a finger touch. The sensor controller 31 carries out a process of detecting a finger touch using a time period remaining after step S60 (step S61).

Having finished the receiving operation to receive data (E), the sensor controller 31 determines whether it has received a burst signal, data (A), or data (E) or not (step S62). If the sensor controller 31 determines that it has not received any of them as a result, it sets the state flag to "0" (step S63), after which control returns to step S10. Step S63 indicates a process in which the sensor controller 31 fails to detect downlink signals for the reason that the stylus 2 has left the sensing range SR depicted in FIG. 1, for example. If the sensor controller 31 determines that it has received any one of them in step S62, then the sensor controller 31 determines a command that instructs the stylus 2 to send data other than a unique ID (requesting DT) as a command to be sent to the stylus 2 (step S64), and control returns to step S10.

Although not depicted, the sensor controller 31 determines whether it has received all of the fragments (1-bit data) of a serial number SN that can be received via data (E) or not, in parallel to the execution of step S64. If the sensor controller 31 determines that it has received all of the fragments, then it combines the received fragments of a serial number SN as well as the received fragments of a unique ID received in step S40 that has been repeatedly carried out, to thereby recover the unique ID and store the recovered unique ID. In this case, the sensor controller 31 determines the order in which to combine the fragments on the basis of frame index numbers FN sent with the fragments of a serial number SN, and determines the order in which to combine the fragments on the basis of frame index numbers FN sent with the fragments of a unique ID. The position of a serial number SN in a unique ID is specified in advance.

The above process of recovering information is also applicable to pen pressure data P. Specifically, as described above, the stylus 2 sends pen pressure data P as divided over a plurality of frames. The sensor controller 31 is able to determine the order in which to combine the fragments of the pen pressure data P on the basis of frame index numbers FN received with the fragments of the pen pressure data P.

The processes of the sensor controller 31 that correspond to the process of the stylus 2 which is depicted in FIG. 11 have been described above. Next, a specific process in which the controller 90 of the stylus 2 makes the bit rate of data (B), (C), and (A) sent in hover state (the second bit rate) smaller than the bit rate of data (D) and (E) sent in contact state (the first bit rate) will be described in detail below with reference to FIGS. 14 through 19.

Figure 14:
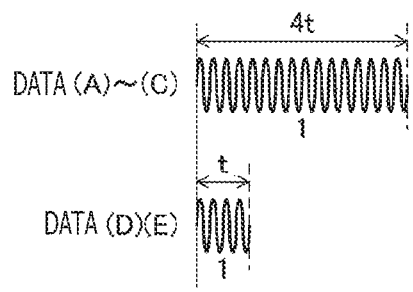
FIG. 14 is a diagram depicting a first example of processes of sending data (A) through (C) and data (D) and (E), which are carried out by the stylus 2 according to the embodiment of the present disclosure.

FIG. 14 is a diagram depicting a first example of processes of sending data (A) through (C) and data (D) and (E), which are carried out by the stylus 2. The transmitter 75 of the stylus 2 in this example is arranged to modulate a carrier signal with data to be sent according to the same modulation process regardless of the state which the stylus 2 is in. Specifically, the transmitter 75 modulates a carrier signal having a fixed frequency with data to be sent according to amplitude modulation (including on-off modulation) or phase modulation. The controller 90 controls the transmitter 75 such that the modulation rate (the number of times which the carrier signal is modulated per unit time) for data (D) and (E) is larger than the modulation rate for data (A) through (C) (4:1 in the example depicted in FIG. 14). As a result, inasmuch as the bit rate of data (D) and (E) (the first bit rate) is larger than the bit rate of data (A) through (C) (the second bit rate), it is possible to send a large volume of data such as pen pressure data P, etc., which is different from switch information SW1 depicted in FIG. 10, for example, in contact state. At the same time, it is possible to reduce demodulation errors and bit value decision error rates in the sensor controller 31 with respect to first digital values (the switch information SW1 depicted in FIG. 10, etc.) sent in hover state, compared with those sent in contact state. The modulation rate may be changed by making the transmission time period in which the data is amplitude-modulated or phase-modulated with the switch information SW1, for example, longer in hover state than in contact state.

Figure 15:
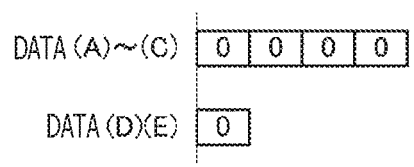
FIG. 15 is a diagram depicting a second example of processes of sending data (A) through (C) and data (D) and (E), which are carried out by the stylus 2 according to the embodiment of the present disclosure.

FIG. 15 is a diagram depicting a second example of processes of sending data (A) through (C) and data (D) and (E), which are carried out by the stylus 2. In this example, the controller 90 controls the transmitter 75 to send each bit of data (D) and (E) just once and send each bit of data (A) through (C) repeatedly four times. This control scheme may have an encoding process that gives more redundancy (for error correction) in hover state or that reduces the modulation rate in hover state as depicted in FIG. 14. From the standpoint of an amount of data that is essentially sent, the bit rate of data (D) and (E) sent (the first bit rate) is larger than the bit rate of data (A) through (C) (the second bit rate described above), so that it is possible also in this example to send data including a large number of items of information such as pen pressure data P, etc., which is different from switch information SW1 in contact state, and at the same time to reduce decision error rates in the sensor controller 31 with respect to first digital values (the switch information SW1 depicted in FIG. 10, etc.) sent in hover state, compared with those sent in contact state.

The encoding process that gives more redundancy for error correction has a redundancy ratio that may not necessarily be N:1 (N is an integer of 2 or larger) insofar as it is larger in hover state than in contact state. For example, the same information may be repeated M times (M is an integer of 2 or larger) in contact state and may be repeated N times (N>M) in hover state.

Figure 16:
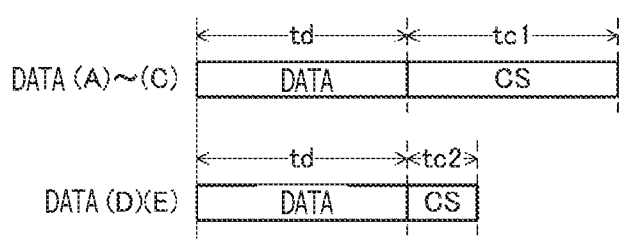
FIG. 16 is a diagram depicting a third example of processes of sending data (A) through (C) and data (D) and (E), which are carried out by the stylus 2 according to the embodiment of the present disclosure.

FIG. 16 is a diagram depicting a third example of processes of sending data (A) through (C) and data (D) and (E), which are carried out by the stylus 2. In this example, the controller 90 controls the transmitter 75 to add a check sum CS (first error detecting code) to the end of a data signal. For sending data (A) through (C), the number of bits of the added check sum CS is made larger than the number of bits of the added check sum CS that sends data (D) and (E). Specifically, to data having a size (which is assumed to be of n bits) commensurate with a transmission time period td, there is added a check sum CS having a size commensurate with a transmission time period tc1 for data (A) through (C), or a check sum CS having a size commensurate with a transmission time period tc2 (<tc1) for data (D) and (E). Since a bit rate indicates the number of bits sent per unit time, the bit rate of data (D) and (E) (the first bit rate) is represented by n/(td+tc2) and the bit rate of data (A) through (C) (the second bit rate) is represented by n/(td+tc1). Since tc1>tc2, the latter bit rate (=n/(td+tc1)) is of a value smaller than the former bit rate (=n/(td+tc2)). According to the present example, therefore, the second bit rate is of a value smaller than the first bit rate.

Figure 17:
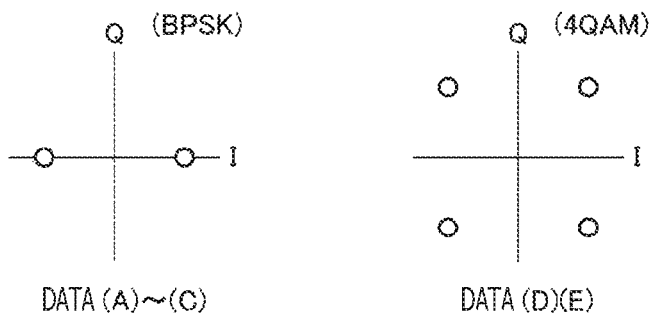
FIG. 17 is a diagram depicting a fourth example of processes of sending data (A) through (C) and data (D) and (E), which are carried out by the stylus 2 according to the embodiment of the present disclosure.

FIG. 17 is a diagram depicting a fourth example of processes of sending data (A) through (C) and data (D) and (E), which are carried out by the stylus 2. In this example, the stylus 2 uses either phase modulation (specifically, binary phase shift keying (BPSK)) or amplitude modulation as a modulation process (second modulation process) for data (A) through (C), and uses amplitude phase modulation (specifically, 4 quadrature amplitude modulation (QAM)) as a modulation process (first modulation process) for data (D) and (E). In other words, different modulation processes are used for data (A) through (C) and data (D) and (E) for making the bit rate of data (A) through (C) smaller than the bit rate of data (D) and (E). The first modulation process has a smaller bit error rate than the second modulation process. Specifically, in the example depicted in FIG. 17, the ratio of the bit rate of data (D) and (E) (the first bit rate) and the bit rate of data (A) through (C) (the second bit rate) is 2:1. According to the present example, therefore, the second bit rate is also of a value smaller than the first bit rate.

Figure 18:
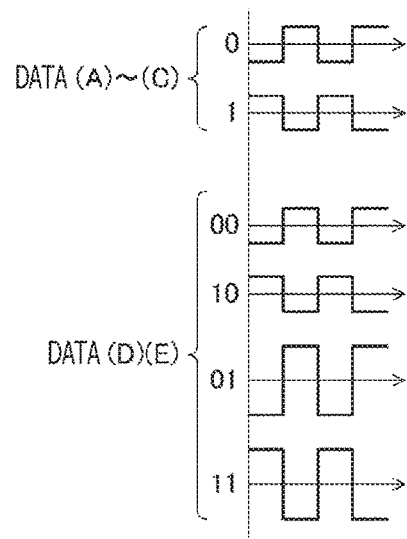
FIG. 18 is a diagram depicting a fifth example of processes of sending data (A) through (C) and data (D) and (E), which are carried out by the stylus 2 according to the embodiment of the present disclosure.

FIG. 18 is a diagram depicting a fifth example of processes of sending data (A) through (C) and data (D) and (E), which are carried out by the stylus 2. The stylus 2 in this example, as with the stylus 2 in the fourth example, uses either phase modulation (specifically, BPSK) or amplitude modulation as a modulation process for data (A) through (C), and uses amplitude phase modulation as a modulation process for data (D) and (E). The amplitude phase modulation according to the present example expresses a first bit with phase (0 degree or 180 degrees) and expresses a second bit with amplitude (multiplied by 1 or multiplied by 2). In the present example, as with the fourth example, since the ratio of the bit rate of data (D) and (E) (the first bit rate) and the bit rate of data (A) through (C) (the second bit rate) is 2:1, the second bit rate is of a value smaller than the first bit rate.

Figure 19:
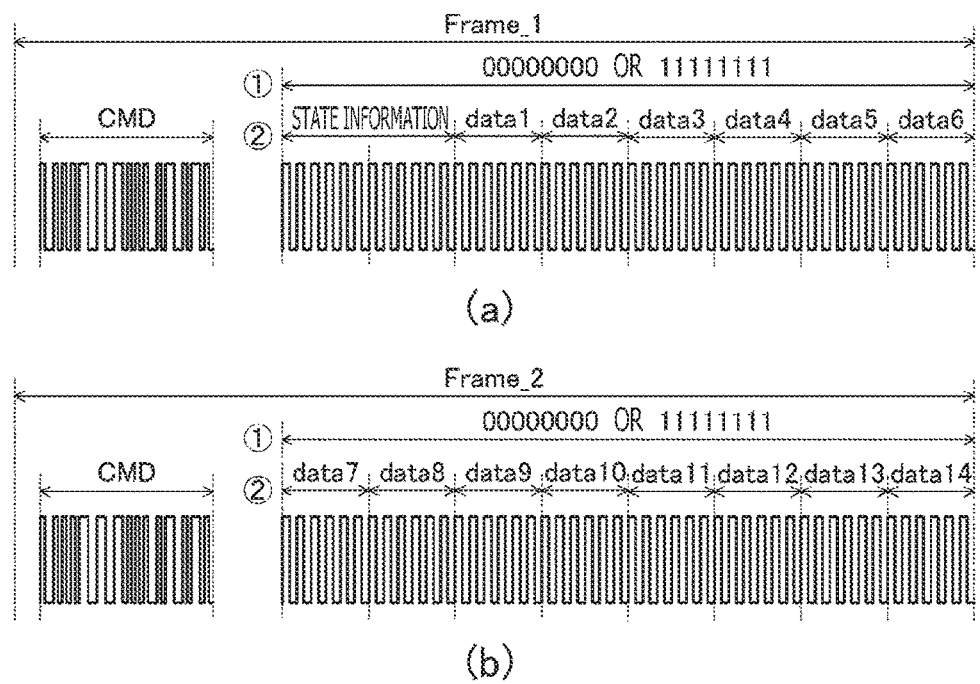
FIG. 19 is a diagram depicting a sixth example of processes of sending data (A) through (C) and data (D) and (E), which are carried out by the stylus 2 according to the embodiment of the present disclosure.

FIG. 19 is a diagram depicting a sixth example of processes of sending data (A) through (C) and data (D) and (E), which are carried out by the stylus 2. This example relates to the transmission of a command signal from the sensor controller 31 and the transmission of downlink signals from the stylus during a blank period in which the display panel having the linear electrodes 30X and 30Y disposed therein is de-energized. FIG. 19(a) depicts a frame Frame_1 corresponding to a first blank period and FIG. 19(b) depicts a frame Frame_2 corresponding to a second blank period that follows the first blank period. In each of FIGS. 19(a) and 19(b), an encircled numeral "1" corresponds to data (B) and (C), whereas an encircled numeral "2" corresponds to data (D) and (E).

For sending data (D) and (E), the stylus 2 according to this example sends 14 bits of information using two frames Frame_1, Frame_2. More specifically, in the frame Frame_1, the stylus 2 sends 1-bit data data1 through data6 following 2-bit information serving as state information indicating that the stylus 2 is in hover state or in contact state, and in the frame Frame_2, the stylus 2 sends 1-bit data data7 through data14. The 2-bit information serving as the state information placed initially in the frame Frame_1 is specifically "01" or "10," and is placed for the sensor controller 31 to distinguish between data (D) and (E) and data (B) and (C).

For sending data (B) and (C), the stylus 2 sends 2 bits of information using two frames Frame_1, Frame_2. More specifically, in the frame Frame_1, the stylus 2 sends a first bit of information ("0" or "1") eight times, and in the frame Frame_2, the stylus 2 sends a second bit of information ("0" or "1") eight times.

In this example, in other words, the stylus 2 sends each bit of data to be sent just once for data (D) and (E), and sends each bit of data to be sent repeatedly eight times for data (B) and (C). The stylus 2 operating in this manner is the same as the stylus 2 according to the second example depicted in FIG. 15 except that the number of repetitions is different. According to the present example, therefore, the second bit rate is of a value smaller than the first bit rate.

As described above, the stylus 2 according to the present embodiment makes it possible to make the bit rate of data (B) and (C) sent in hover state (the second bit rate) smaller than the bit rate of data (D) and (E) sent in contact state (the first bit rate). Consequently, the noise resistance in hover state in which the SN ratio of downlink signals tends to be poor is improved, resulting in advantages including a reduction in the non-detection ratio of downlink signals, a reduction in the bit error detection ratio at the time downlink signals are modulated or decoded, and a reduction in the decoding error ratio while taking error correction into consideration. Thus, even if downlink signals are sent with the same transmission intensity as in contact state, the possibility of a failure to receive downlink signals in hover state can be lowered.

Furthermore, since data (A) is sent at the same small bit rate as data (B) regardless of the state which the stylus 2 is in, the sensor controller 31 can reliably receive state information State regardless of the state which the stylus 2 is in. Therefore, the receiving operation (the first or second demodulation process described above) of the sensor controller 31 can be changed reliably in accordance with the bit rate of downlink signals, so that the stylus 2 can reliably send data (B) through (E) to the sensor controller 31.

Moreover, as depicted in FIG. 10, since each frame has a frame index number FN, when the stylus 2 sends large-size data such as a unique ID or pen pressure data P as divided over a plurality of frames, the sensor controller 31 that receives those data can appropriately recover the information on the basis of the frame index numbers FN even if the divided information is not received in order.

Although the preferred embodiment of the present disclosure has been described above, the present disclosure is not limited to the embodiment, but can be reduced to practice in various forms without departing from the scope thereof.

For example, according to the above embodiment, a burst signal and data (A) are sent immediately before each of data (B) through (E). However, the transmission of a burst signal and data (A) immediately before data (D) and (E) may be omitted, for example.

In the above embodiment, the stylus 2 sends state information State in all frames. However, when two or more frames are sent in succession, state information State may be included in the first one of the two or more frames, and state information State may not be included in the subsequent frames following the first frame. More specifically, state information State may not be sent (or its transmission may be omitted) in other frames than the frame sent first in a superframe. In this case, the sensor controller 31 may store state information State received in the first frame and apply the stored state information State to the subsequent frames. The transmission of state information State should preferably be omitted only when the stylus 2 is in contact state.

Though not particularly described in the above embodiment, the state of the stylus 2 that is determined as the contact state in step S85 depicted in FIG. 11 may be called "unique ID transmission mode," and state of the stylus 2 that is determined as the contact state in step S90 depicted in FIG. 11 may be called "serial number transmission mode." In this case, the controller 90 of the stylus 2 controls the transmitter 75 to send the part of the unique ID of the stylus 2 that excludes the serial number by way of data (D) in a superframe compatible with the unique ID transmission mode, and controls the transmitter 75 to send the serial number SN by way of data (E) in a superframe compatible with the serial number transmission mode.

In the above embodiment, the stylus 2 determines the content of a command signal sent from the sensor controller 31, determines whether the command is a command (ID) that instructs the stylus 2 to send a unique ID or a command (DT) that instructs the stylus 2 to send data other than a unique ID, and selectively sends a unique ID or data other than a unique ID depending on the result of the determination. The stylus 2 may make such determination on the basis of its own state (e.g., the operated state of a switch SW1). For example, if the switch SW1 is not operated (i.e., the user is not touching an operating section (switch SW1, switch SW2, etc.) of the stylus 2 at all), the stylus 2 may send a unique ID, and if the switch SW1 is operated (i.e., it is turned on), the stylus 2 may send data other than a unique ID (information of the switch SW1 or the like). When the stylus 2 is not operated, therefore, it can complete the transmission of a unique ID that has a relatively large amount of information. A unique ID that is sent in hover state may include the information of a serial number SN that is sent in contact state.

When the sensor controller 31 is to send an uplink signal including optional data such as a command or the like (third digital value), it may add a check sum corresponding to the data (second error detecting code). In this case, the stylus 2 should preferably determine whether it has correctly received the data sent by the sensor controller 31 or not, using the check sum. The stylus 2 may send a long burst signal, a burst signal, and data (A) through (E) regardless of the result of the determination (even if the result of the determination is negative).

First and second modifications of the above embodiment will be described below.

Figure 20:
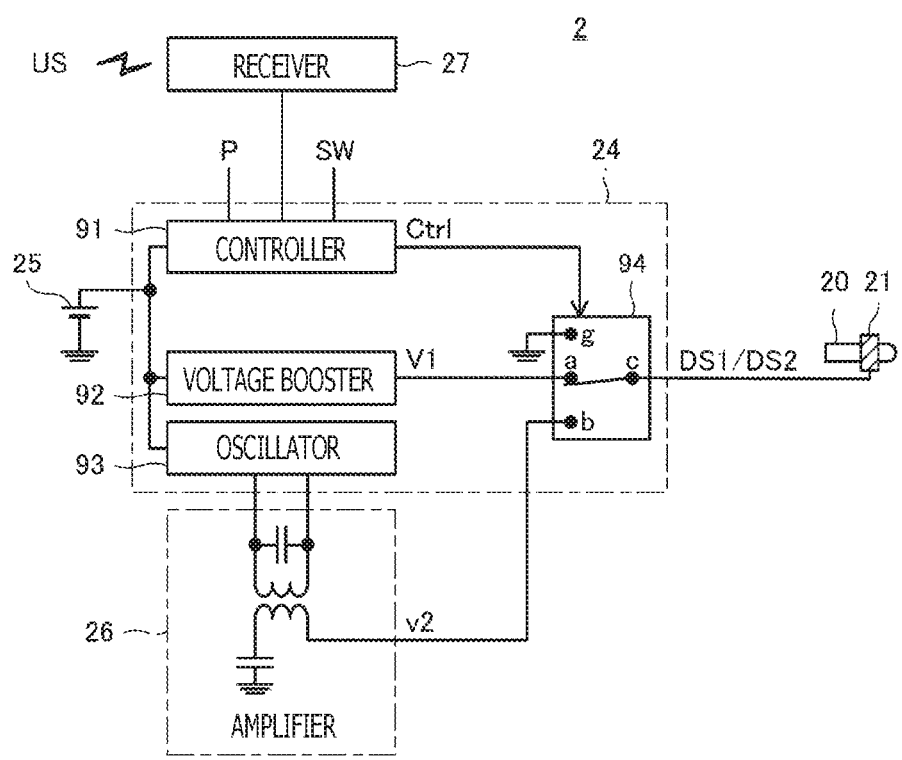
FIG. 20 is a diagram depicting an arrangement of a stylus 2 according to a first modification of the embodiment of the present disclosure.

FIG. 20 is a diagram depicting an arrangement of a stylus 2 according to a first modification of the above embodiment. A sensor controller 31 and the stylus 2 according to the present modification are different from those of the above embodiment in that they, for the purpose of transmission of uplink signals, use wireless communications not on the capacitive coupling principle. The stylus 2 is different from that of the above embodiment in that it supports the transmission of two kinds of downlink signals DS1 and DS2 whose carrier signals are of different types from each other. Both the downlink signals DS1 and DS2 are capable of sending a long burst signal, a burst signal, and data (A) through (E) as described above. The stylus 2 selectively uses the downlink signals DS1 and DS2 depending on the kind of the sensor controller 31 which is in close proximity thereto. The arrangement of the stylus 2 according to the present modification will be described in detail below with reference to FIG. 20.

As depicted in FIG. 20, the stylus 2 according to the present modification has an electrode 21, a signal processor 24, a power supply 25, an amplifier 26, and a receiver 27.

The receiver 27 is a functional section capable of performing communication by way of Bluetooth® (registered trademark) as wireless communication. According to the present modification, the receiver 27 receives an uplink signal that the sensor controller 31 has sent by way of Bluetooth® (registered trademark).

The signal processor 24 is a functional section having a function to selectively send the two kinds of downlink signals DS1 and DS2 and a function to receive an uplink signal US via the receiver 27. Specifically, the signal processor 24 has a controller 91, a voltage booster 92, an oscillator 93, and a switch 94.

The voltage booster 92 has a function to boost a DC voltage supplied from the power supply 25, generating a DC voltage V1. According to a specific example, the voltage booster 92 includes a DC-DC converter or a charge pump circuit.

The oscillator 93 has a function to perform an oscillating operation based on the DC voltage supplied from the power supply 25 to generate an unmodulated sine-wave signal (carrier signal) that oscillates at a predetermined frequency. The amplifier 26 has a function to amplify the sine-wave signal generated by the oscillator 93 with a predetermined amplification factor, generating an unmodulated sine-wave signal v2. As depicted in FIG. 20, the amplifier 26 should preferably include am amplifying circuit made up of a transformer and capacitors.

The switch 94, which includes a one-circuit three-contact switch element, has a terminal "a" connected to the output terminal of the voltage booster 92, a terminal "b" connected to the output terminal of the amplifier 26, a terminal "g" connected to a power supply line that is supplied with a ground potential, and a common terminal c connected to the electrode 21.

The controller 91 includes an IC, which supplies a control signal Ctrl that controls the switch 94 and which controls the receiver 27 to receive an uplink signal sent by the sensor controller 31. The controller 91 operates with electric power supplied from the power supply 25. According to a specific example, the controller 91 may include an application specific integrated circuit (ASIC) or an MCU. The controller 91 determines the kind of a downlink signal (the downlink signal DS1 or the downlink signal DS2) used to send a long burst signal, a burst signal, and data (A) through (E) as depicted in FIG. 10, on the basis of the content of an uplink signal received via the receiver 27 or the fact that no uplink signal is received (in a case where the sensor controller 31 is designed to operate with only unidirectional communication from the stylus 2 to the sensor controller 31). As with the controller 90 depicted in FIG. 8, the controller 91 also determines a transmission and reception schedule for various signals, etc., and controls the switch 94 based on the determined transmission and reception schedule.

For sending the downlink signal DS1, the controller 91 controls the switch 94 to function as a first switch provided between the output terminal of the voltage booster 92 and the electrode 21. Specifically, the controller 91 controls the switch 94 to switch between a state in which the terminal "a" is connected to the common terminal "c" and a state in which the terminal "g" is connected to the common terminal "c." The state in which the terminal "a" is connected to the common terminal "c" corresponds to a state in which the first switch is on, and the state in which the terminal "g" is connected to the common terminal "c" corresponds to a state in which the first switch is off.

For sending a burst signal or a long burst signal using the downlink signal DS1, the controller 91 controls the switch 94 to perform switching operations periodically in predetermined periodic cycles. When the terminal "a" is connected to the common terminal "c," the DC voltage V1 comes through as the output voltage of the switch 94. When the terminal "g" is connected to the common terminal "c," the ground potential comes through as the output voltage of the switch 94. Consequently, the switch 94 outputs an unmodulated pulse train signal that serves as a long burst signal or a burst signal.

For sending a data signal using the downlink signal DS1, the controller 91 controls the switch 94 to perform a switching operation depending on data, such as a unique ID, pen pressure data P, or switch information SW which indicates whether a switch (not depicted) on the stylus 2 is on or off, to thereby generate a data signal which includes a pulse train signal modulated with the data. Specific methods of modulating a pulse train signal by the controller 91 may include on-off modulation and frequency modulation.

For sending the downlink signal DS2, the controller 91 controls the switch 94 to function as a second switch provided between the output terminal of the amplifier 26 and the electrode 21. Specifically, the controller 91 controls the switch 94 to switch between a state in which the terminal "b" is connected to the common terminal "c" and a state in which the terminal "g" is connected to the common terminal "c." The state in which the terminal "b" is connected to the common terminal "c" corresponds to a state in which the second switch is on, and the state in which the terminal "g" is connected to the common terminal "c" corresponds to a state in which the second switch is off.

For sending a burst signal or a long burst signal using the downlink signal DS2, the controller 91 controls the switch 94 to fixedly connect the common terminal "c" to the terminal "b." Therefore, the switch 94 outputs the unmodulated sine-wave signal v2 that serves as a long burst signal or a burst signal.

For sending a data signal using the downlink signal DS2, the controller 91 controls the switch 94 to perform a switching operation depending on data such as a unique ID, pen pressure data P, or switch information SW, to thereby generate a data signal which includes a sine-wave signal modulated with the data. A specific method of modulating a sine-wave signal by the controller 91 may include on-off modulation.

According to the present modification, as described above, Bluetooth® (registered trademark) can be used to send and receive an uplink signal. Although the example using Bluetooth® (registered trademark) has been described above, proximity wireless communications other than Bluetooth® (registered trademark) may be used to send and receive an uplink signal.

According to the present modification, the stylus 2 is capable of performing bidirectional or unidirectional communication between itself and a plurality of different types of sensor controllers 31 by selectively using the downlink signals DS1 and DS2.

Figure 21:
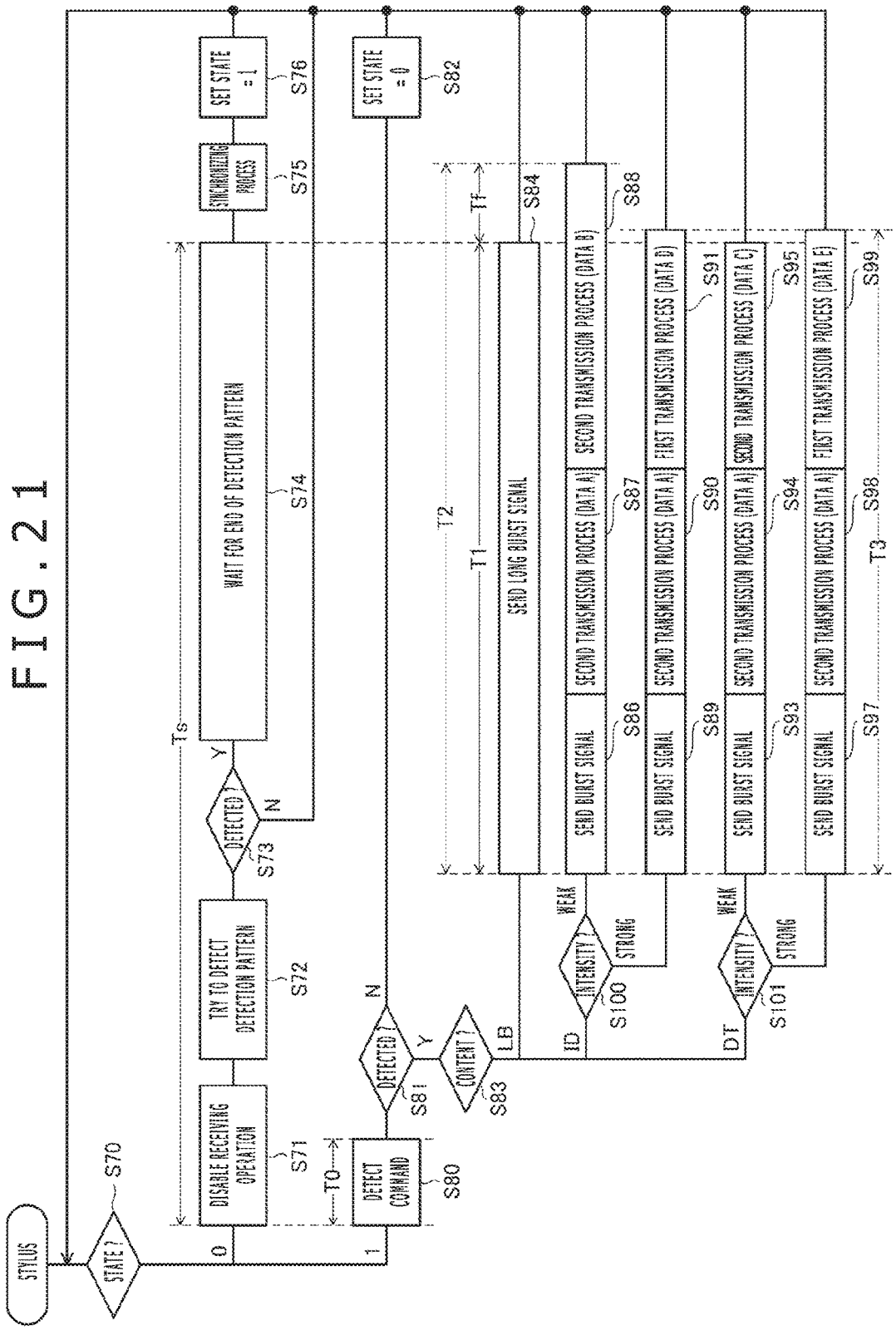
FIG. 21 is a flowchart of a process of receiving uplink signals and a process of sending downlink signals, which are carried out by a stylus 2 according to a second modification of the embodiment of the present disclosure.

FIG. 21 is a flowchart of an operation sequence of a stylus 2 according to a second modification of the above embodiment. The stylus 2 according to the present modification is different from the stylus according to the above embodiment in that it determines its own state on the basis of the received intensity of an uplink signal rather than the pen pressure being detected by the pen pressure detection sensor 23. Operation of the stylus 2 according to the present embodiment primarily with respect to the differences from the above embodiment will be described in detail below with reference to FIG. 21.

The stylus 2 according to the present modification determines an intensity in steps S100 and S101 instead of determining a state in steps S85 and S92 depicted in FIG. 11. Steps S100 and S101 are steps of determining the received intensity of the command signal detected in previous step S80.

If the stylus 2 determines that the received intensity is smaller than a predetermined value (i.e., "weak") in step S100, then the stylus 2 determines its own state as the hover state. As with the case of deciding the hover state in step S85, the stylus 2 sends a burst signal and data (A) and (B) (steps S86 through S88). If the stylus 2 determines that the received intensity is equal to or larger the predetermined value (i.e., "strong") in step S100, then the stylus 2 determines its own state as the contact state. As with the case of deciding the contact state in step S85, the stylus 2 sends a burst signal and data (A) and (D) (steps S89 through S91).

If the stylus 2 determines that the received intensity is smaller than the predetermined value (i.e., "weak") in step S101, then the stylus 2 determines its own state as the hover state. As with the case of deciding the hover state in step S92, the stylus 2 sends a burst signal and data (A) and (C) (steps S93 through S95). If the stylus 2 determines that the received intensity is equal to or larger the predetermined value (i.e., "strong") in step S101, then the stylus 2 determines its own state as the contact state. As with the case of deciding the contact state in step S92, the stylus 2 sends a burst signal and data (A) and (E) (steps S97 through S99).

As described above, the stylus 2 according to the present modification is capable of determining its own state on the basis of the received intensity of a command signal rather than a pen pressure. Therefore, the present disclosure is applicable to a stylus 2 that has no pen pressure detecting function, for example.

In the present modification, the example in which the stylus 2 determines its own state based on the received intensity of an uplink signal (specifically, a command signal) has been described. However, the sensor controller 31 may determine the state of the stylus 2 based on the received intensity of a downlink signal in the sensor controller 31, and indicate the result to the stylus 2. In this case, preferably, the sensor controller 31 includes state information indicating the state of the stylus 2 as part of a command signal, and the stylus 2 receives and decodes the state information, thereby acquiring its own state.

DESCRIPTION OF REFERENCE SYMBOLS

2: Stylus
3: Electronic device
20: Core body
21: Electrode
22, 44x, 44y, 62: Switch
23: Pen pressure detection sensor
24: Signal processor
25: Power supply
26: Amplifier
27, 50, 71: Receiver
30: Sensor
30X, 30Y: Linear electrode 31: Sensor controller
40: Selector
41x, 41y: Conductor selecting circuit
51: Amplifying circuit
52: Detecting circuit
53: Converter
60, 75: Transmitter
61: Pattern supply
63: Spreading processor
64: Code train holder
65: Transmission guard
70: Logic unit
71a: Waveform regenerator
71b: Correlation operator
73: Modulator
74: Voltage boosting circuit
76: Switch
90, 91: Controller
92: Voltage booster
93: Oscillator
94: Switch
FN: Frame index number
Mode: Mode information
Op: Inverted bit
P: Pen pressure data
RS: Reserved information
SN: Serial number
Start: Start flag
State: State information
SW1, SW2, SW3: Switch information

The invention claimed is:

1. A stylus comprising:
a core body;
an electrode disposed adjacent to the core body;
a transmitter that sends a signal including a first digital value using the electrode; and
a controller that determines whether the stylus is in contact state in which the core body is held in contact with an operating surface or in hover state in which the core body is not held in contact with the operating surface, controls the transmitter to send the first digital value at a first bit rate when the stylus is determined to be in contact state, and controls the transmitter to send the first digital value at a second bit rate smaller than the first bit rate when the stylus is determined to be in hover state, wherein one bit is transmitted in a shorter time period when the stylus is in contact state and is transmitted in a longer time period when the stylus is in hover state.

2. The stylus according to claim 1, wherein the controller controls the transmitter to send the first digital value at the first bit rate when the stylus is determined to be in contact state and at the second bit rate when the stylus is determined to be in hover state, by making a transmission time period used to send the first digital value per bit shorter when the stylus is in contact state than when the stylus is in hover state.

3. The stylus according to claim 2, wherein the controller controls the transmitter to send the first digital value at the second bit rate when the stylus is determined to be in hover state, by making a modulation rate for the first digital value lower when the stylus is in hover state than when the stylus is in contact state.

4. The stylus according to claim 1, wherein the controller controls the transmitter to send the first digital value at the first bit rate when the stylus is determined to be in contact state and at the second bit rate when the stylus is determined to be in hover state, by repeatedly sending one bit of the first digital value when the stylus is in hover state.

5. The stylus according to claim 1, wherein the controller controls the transmitter to send the first digital value at the first bit rate when the stylus is determined to be in contact state and at the second bit rate when the stylus is determined to be in hover state, by making a number of bits of a first error detecting code sent with the first digital value greater when the stylus is in hover state than when the stylus is in contact state.

6. The stylus according to claim 1, wherein the controller controls the transmitter to send the first digital value at the first bit rate when the stylus is determined to be in contact state and at the second bit rate when the stylus is determined to be in hover state, by controlling the transmitter to modulate the first digital value according to a first modulation process when the stylus is in contact state and according to a second modulation process whose bit error rate is smaller than the first modulation process when the stylus is in hover state.

7. The stylus according to claim 1, wherein the controller controls the transmitter to send the first digital value at the first bit rate when the stylus is determined to be in contact state and at the second bit rate when the stylus is determined to be in hover state, by controlling the transmitter to modulate the first digital value using amplitude phase modulation when the stylus is in contact state and using either amplitude modulation or phase modulation when the stylus is in hover state.

8. The stylus according to claim 1, wherein
the controller controls the transmitter to send the signal including the first digital value during a blank period in which a display panel is de-energized, and
the controller controls the transmitter to send the first digital value at the first bit rate when the stylus is determined to be in contact state and at the second bit rate when the stylus is determined to be in hover state, by making an amount of information sent during one blank period smaller when the stylus is in hover state than when the stylus is in contact state.

9. The stylus according to claim 1, wherein the controller controls the transmitter to send state information indicative of whether the stylus is determined to be in contact state or in hover state.

10. The stylus according to claim 9, wherein
the controller controls the transmitter to send the signal in frames, and
the state information is placed before the first digital value in one frame.

11. The stylus according to claim 10, wherein
the controller controls the transmitter to send the state information at the second bit rate regardless of whether the stylus is determined to be in contact state or in hover state, and
the controller controls the transmitter to send the state information at the second bit rate and thereafter send the first digital value at the first bit rate when the stylus is determined to be in contact state.

12. The stylus according to claim 10, further comprising a pen pressure detector that detects a pen pressure applied to the core body,
wherein
the controller controls the transmitter to send a second digital value representing the pen pressure detected by the pen pressure detector, subsequently to the state information in one frame, at the first bit rate when the stylus is determined to be in contact state.

13. The stylus according to claim 9, wherein
the controller controls the transmitter to send the first digital value at the first bit rate when the stylus is determined to be in contact state, by repeatedly sending one bit of the first digital value when the stylus is determined to be in hover state, and
the controller sends the state information by initially sending a plurality of digital values which are different from each other when the stylus is determined to be in contact state.

14. The stylus according to claim 9, wherein
the controller controls the transmitter to send the signal in a superframe including a predetermined number of frames, and
the controller controls the transmitter to send the state information in an initially sent one of the frames in the superframe and not to send the state information in frames other than the initially sent one of the frames in the superframe.

15. The stylus according to claim 14, wherein the superframe corresponds to an operating period of a display process for a display panel.

16. The stylus according to claim 14, wherein the controller, to send two or more of the frames in succession, controls the transmitter to include the state information in a first one of the two or more of the frames and not to send the state information in subsequent frames following the first one of the two or more of the frames.

17. The stylus according to claim 16, wherein the controller controls the transmitter to send a serial number, which forms part of a unique ID assigned to the stylus, when the stylus is determined to be in contact state.

18. The stylus according to claim 17, wherein the controller controls the transmitter to send the serial number as divided over a predetermined number of frames in the superframe.

19. The stylus according to claim 17, wherein the serial number indicates information for a sensor controller to identify a plurality of styluses which are in use with the sensor controller.

20. The stylus according to claim 17, wherein the serial number indicates a pen tip setting type of the stylus.

21. The stylus according to claim 16, wherein
the controller operates in one of a unique ID transmission mode and a serial number transmission mode per superframe when the stylus is determined to be in contact state, and
the controller controls the transmitter to send part of the unique ID that excludes the serial number in a superframe in the unique ID transmission mode, and controls the transmitter to send the serial number in a superframe in the serial number transmission mode.

22. The stylus according to claim 16, wherein the controller controls the transmitter to send, in each of the predetermined number of frames, a frame index number representing order of the frames in the superframe.

23. The stylus according to claim 1, further comprising a receiver that receives from a sensor controller an uplink signal including a third digital value and a second error detecting code corresponding to the third digital value,
wherein
the receiver determines whether the third digital value has been correctly received or not, using the second error detecting code after having received the uplink signal, and
the controller controls the transmitter to send a downlink signal regardless of a result of the determination by the receiver.

24. The stylus according to claim 1, wherein the controller controls the transmitter to send an inverted bit immediately after a predetermined number of bits, the inverted bit being generated by inverting the last one of the predetermined number of bits.

25. A stylus comprising:
a core body;
an electrode disposed adjacent to the core body;
a transmitter that sends a signal including a first digital value using the electrode; and
a controller that determines whether the stylus is in contact state in which the core body is held in contact with an operating surface or in hover state in which the core body is not held in contact with the operating surface, controls the transmitter to send the first digital value according to a first signal transmission process when the stylus is determined to be in contact state, and controls the transmitter to send the first digital value according to a second signal transmission process whose decoding error rate is smaller than the first signal transmission process when the stylus is determined to be in hover state, wherein one bit is transmitted in a shorter time period when the stylus is in contact state and is transmitted in a longer time period when the stylus is in hover state.

26. A sensor controller comprising:
memory including computer-executable instructions, and
one or more processors configured to execute the instructions to perform:
acquiring state information of a stylus from a signal received from the stylus according to a first demodulation process;
acquiring a first digital value included subsequently to the state information according to the first demodulation process if the state information indicates that the stylus is in hover state; and
acquiring the first digital value included subsequently to the state information according to a second demodulation process whose bit error rate is higher than the first demodulation process if the state information indicates that the stylus is in contact state, wherein one bit is transmitted from the stylus in a shorter time period when the stylus is in contact state and is transmitted from the stylus in a longer time period when the stylus is in hover state.

* * * * *